US012687944B2

(12) United States Patent
Koike et al.

(10) Patent No.: US 12,687,944 B2
(45) Date of Patent: Jul. 21, 2026

(54) ACTIVE STYLUS DOWNLINK SIGNAL TRANSMISSION TIMING CONTROL RELATIVE TO SENSOR CONTROLLER

(71) Applicant: Wacom Co., Ltd., Saitama (JP)

(72) Inventors: Takeshi Koike, Kanagawa (JP); Hideyuki Hara, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 124 days.

(21) Appl. No.: 18/068,009

(22) Filed: Dec. 19, 2022

(65) Prior Publication Data

US 2023/0127561 A1     Apr. 27, 2023

Related U.S. Application Data

(63) Continuation of application No. 17/828,367, filed on May 31, 2022, now Pat. No. 11,556,204, which is a
(Continued)

(51) Int. Cl.
*G06F 3/041*      (2006.01)
*G06F 3/03*       (2006.01)
(Continued)

(52) U.S. Cl.
CPC ............ *G06F 3/04162* (2019.05); *G06F 3/03* (2013.01); *G06F 3/03545* (2013.01);
(Continued)

(58) Field of Classification Search
CPC ........ G06F 3/03; G06F 3/033; G06F 3/03545; G06F 3/038; G06F 3/0383; G06F 3/041;
(Continued)

(56) References Cited

U.S. PATENT DOCUMENTS 5,600,105 A * 2/1997 Fukuzaki ............ G06F 3/03545
                                                        178/19.06
8,493,359 B2    7/2013 Wright et al.
(Continued)

FOREIGN PATENT DOCUMENTS

CN        102073423 A      5/2011
CN        102479020 B      1/2014
(Continued)

OTHER PUBLICATIONS

Chinese Office Action, dated Jun. 3, 2020, for Chinese Application No. 201680020981.3, 23 pages. (With English machine translation).
(Continued)

*Primary Examiner* — Keith L Crawley
(74) *Attorney, Agent, or Firm* — Seed Intellectual Property Law Group LLP

(57)          ABSTRACT

A method in which a sensor controller is connected to a sensor having an electrode group provided together with a display panel configured to operate in during a variable refresh cycle among a plurality of refresh cycles, and an active stylus performs bidirectional communication with the sensor controller. According to the method, the sensor controller acquires a present refresh cycle among the plurality of refresh cycles of the display panel, generates an uplink signal, which serves as a reference for synchronization corresponding to the acquired present refresh cycle, and transmits the uplink signal to the active stylus, which is not detected as yet or is detected already, at the present refresh cycle.

20 Claims, 16 Drawing Sheets

CC_UP

UPLINK SIGNAL US    | USsub | USsub | CC0 | CC1 | CC2 | CRC |

Related U.S. Application Data continuation of application No. 17/195,235, filed on Mar. 8, 2021, now Pat. No. 11,347,346, which is a continuation of application No. 16/105,496, filed on Aug. 20, 2018, now Pat. No. 10,942,598, which is a continuation of application No. 15/698,359, filed on Sep. 7, 2017, now Pat. No. 10,055,036, which is a continuation of application No. PCT/JP2016/060906, filed on Apr. 1, 2016.

(60) Provisional application No. 62/145,412, filed on Apr. 9, 2015.

(51) Int. Cl.

| | |
|---|---|
| *G06F 3/0354* | (2013.01) |
| *G06F 3/038* | (2013.01) |
| *G06F 3/044* | (2006.01) |
| *G09G 3/20* | (2006.01) |
| *G09G 3/36* | (2006.01) |

(52) U.S. Cl.
CPC ............ *G06F 3/0383* (2013.01); *G06F 3/041* (2013.01); *G06F 3/0412* (2013.01); *G06F 3/0441* (2019.05); *G06F 3/0442* (2019.05); *G09G 3/20* (2013.01); *G06F 2203/0384* (2013.01); *G09G 3/3648* (2013.01); *G09G 2310/061* (2013.01); *G09G 2310/08* (2013.01); *G09G 2330/06* (2013.01)

(58) Field of Classification Search
CPC .. G06F 3/0412; G06F 3/04162; G06F 3/0418; G06F 3/04184; G06F 3/044; G06F 3/0441; G06F 3/0442; G06F 2203/0384; G06F 2203/04114; G09G 3/20; G09G 3/3648; G09G 2310/06; G09G 2310/061; G09G 2310/08; G09G 2330/06
See application file for complete search history.

(56) References Cited

U.S. PATENT DOCUMENTS

| | | | |
|---|---|---|---|
| 9,310,911 | B2 | 4/2016 | Sugita et al. |
| 10,739,909 | B1 | 8/2020 | Lin et al. |
| 2008/0158165 | A1 | 7/2008 | Geaghan et al. |
| 2008/0169132 | A1 | 7/2008 | Ding et al. |
| 2010/0164912 | A1 | 7/2010 | Soga et al. |
| 2011/0122087 | A1 | 5/2011 | Jang et al. |
| 2012/0013555 | A1 | 1/2012 | Maeda et al. |
| 2012/0050231 | A1 | 3/2012 | Westhues et al. |
| 2013/0106797 | A1 | 5/2013 | Pant et al. |
| 2013/0176251 | A1 | 7/2013 | Wyatt et al. |
| 2013/0207926 | A1 | 8/2013 | Kremin et al. |
| 2014/0028607 | A1 | 1/2014 | Tan et al. |
| 2014/0071066 | A1 | 3/2014 | Lee et al. |
| 2015/0256329 | A1 | 9/2015 | Cheong et al. |
| 2015/0277659 | A1 | 10/2015 | Lu et al. |
| 2015/0324029 | A1 | 11/2015 | Bakken et al. |
| 2015/0363012 | A1 | 12/2015 | Sundara-Rajan et al. |
| 2016/0048234 | A1 | 2/2016 | Chandran et al. |
| 2016/0092010 | A1 | 3/2016 | Agarwal et al. |
| 2016/0170506 | A1 | 6/2016 | Westhues et al. |
| 2016/0246390 | A1* | 8/2016 | Lukanc ............... G06F 3/04162 |
| 2016/0320918 | A1 | 11/2016 | Hara |
| 2016/0370915 | A1 | 12/2016 | Agarwal et al. |
| 2016/0378265 | A1 | 12/2016 | Katsurahira et al. |
| 2017/0108984 | A1* | 4/2017 | Takaya .................. G06F 3/0441 |
| 2017/0192549 | A1 | 7/2017 | Katayama et al. |

FOREIGN PATENT DOCUMENTS

| | | |
|---|---|---|
| JP | 5-6153 A | 1/1993 |
| JP | H09-244791 A | 9/1997 |
| JP | 2011-86253 A | 4/2011 |
| JP | 2012-22543 A | 2/2012 |
| JP | 2017-7212 A | 1/2017 |
| KR | 2014-0021504 A | 2/2014 |
| KR | 2015-0027529 A | 3/2015 |
| WO | 2007/111329 A1 | 10/2007 |
| WO | 2013/018736 A1 | 2/2013 |
| WO | 2014/174960 A1 | 10/2014 |
| WO | 2014/185523 A1 | 11/2014 |
| WO | 2014/206027 A1 | 12/2014 |
| WO | 2015/111159 A1 | 7/2015 |
| WO | 2015/141349 A1 | 9/2015 |

OTHER PUBLICATIONS

Communication pursuant to Article 94(3) EPC, for European Application No. 20 189 091.0-1210, dated May 19, 2022, 10 pages.
Extended European Search Report, dated Oct. 18, 2019, for European Application No. 16776481.0-1210 / 3282346, 10 pages.
Extended European Search Report, dated Oct. 16, 2020, for European Application No. 20189091.0, 12 pages.
"In cell/on cell strategy for smartphones of JDI, LG, Sharp is read," Nikkei Technology Online, Jan. 21, 2015, retrieved from http://techon.nikkeibp.co.jp/article/NEWS/20110127/189096, 13 pages. (with Machine-generated English translation).

\* cited by examiner

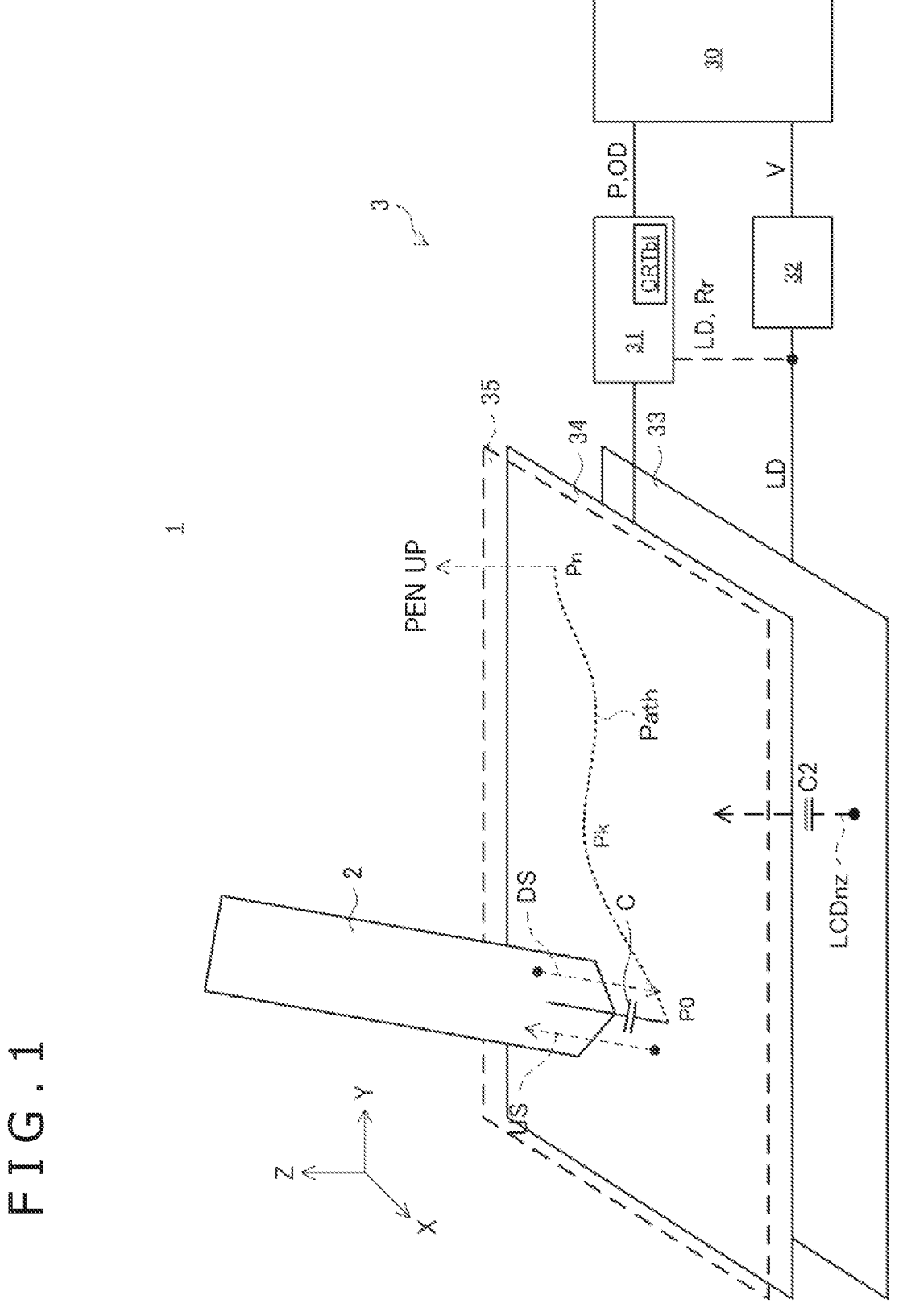
F I G . 1

F I G . 7
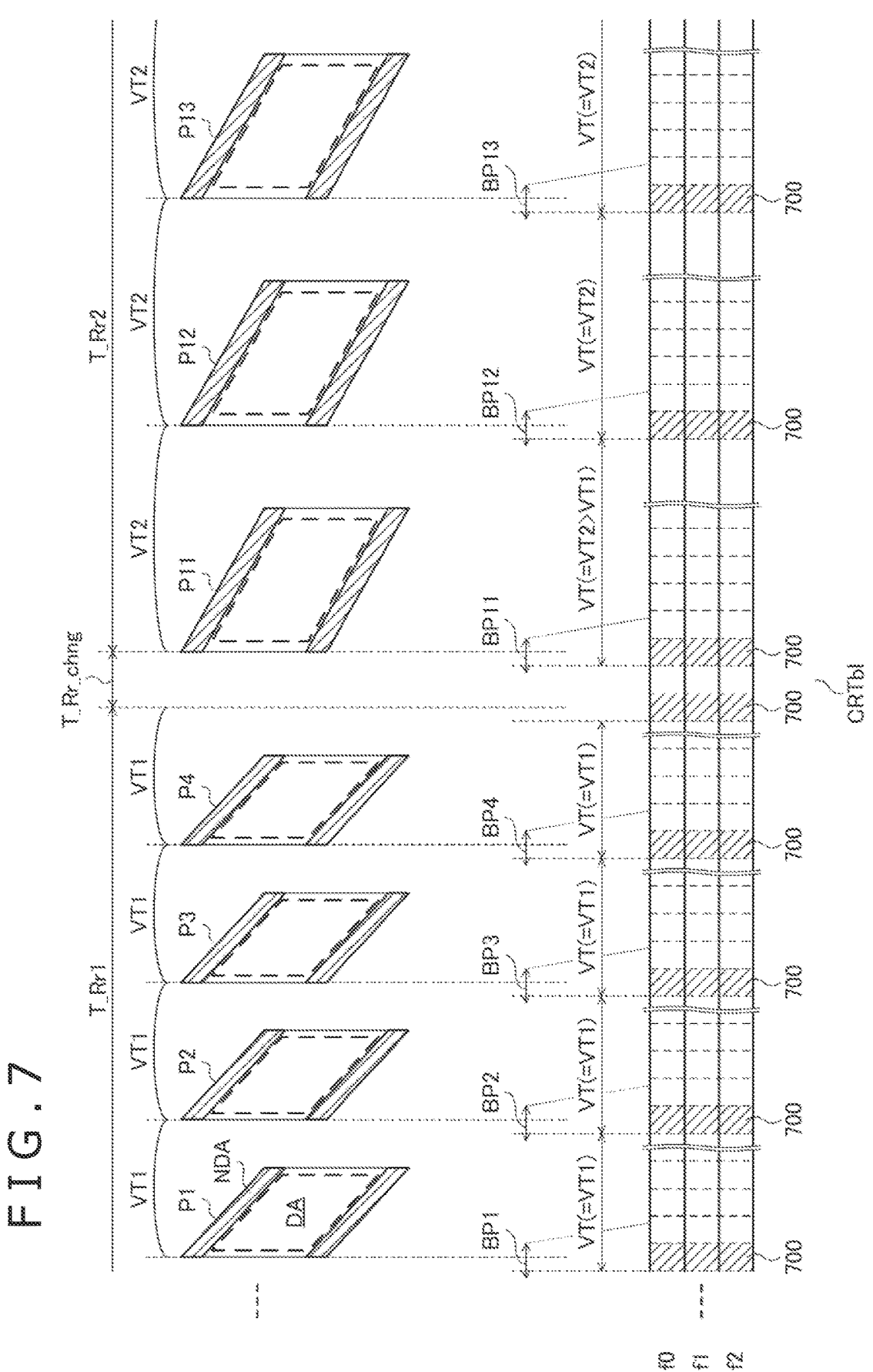

UPLINK SIGNAL US

| USsub | USsub | CC0 | CC1 | CC2 | CRC |

CC_UP

| | data1 | data2 | data3 | data4 |
|---|---|---|---|---|
| D1 | | | S1 | S1 |
| D2 | F | | | |
| D3 | | | | |
| ⋮ | ⋮ | ⋮ | | ⋮ |
| D490 | | | S1 | S1 |
| D491 | F | | | |
| D492 | | | | |

FIG.14A

| | data1 | data2 | data3 | data4 |
|---|---|---|---|---|
| D1 | M1 | | | |
| D2 | | | | |
| D3 | | | | |
| D4 | | | | |
| D5 | | | | |
| D6 | M2 | | | |
| D7 | | | | |

FIG.14B

ACTIVE STYLUS DOWNLINK SIGNAL TRANSMISSION TIMING CONTROL RELATIVE TO SENSOR CONTROLLER

BACKGROUND

Technical Field

The present disclosure relates to a method in which an active stylus and a sensor controller are used, a system, a sensor controller, and an active stylus.

Description of the Related Art

In recent years, as an inputting apparatus for hand-written inputting on a panel of an electronic apparatus, styluses of various types such as the electromagnetic induction type and the capacitance type have been getting used, and a stylus of an active capacitive type is one of such styluses. In the following description, a stylus of the active capacitive type is referred to as "active stylus."

Transmission of a signal by an active stylus is performed by supplying a transmission signal to an electrode provided at a tip of the active stylus such that a variation of an electric field (alternating electric field) is generated in a space in the proximity of the electrode. An electronic apparatus includes a sensor board including an electrode group disposed in a matrix below a panel and a sensor controller connected to the sensor board, and is configured such that the sensor controller detects a variation of a charge amount generated in the electrode group in the sensor board by the alternating electric field to receive a signal transmitted from the active stylus. Patent Document 1 discloses an example of an active stylus configured such that it transmits a signal modulated with writing pressure information, a unique identifier (ID) and so forth together with a non-modulated continuous signal for position detection. In the following description, a non-modulated signal for position detection is referred to as "position signal," and a signal modulated with writing pressure information, a unique ID and so forth is referred to as "data signal."

It is possible for a sensor controller of an electronic apparatus compatible with an active stylus of the active capacitive type also to transmit a signal to the active stylus. The sensor controller supplies a transmission signal to an electrode group that configures a sensor board thereby to generate an electric field on a panel such that a signal can be transmitted toward the stylus. The active stylus is configured such that it detects a variation of the charge amount induced in the electrodes by the electric field by the reception electrodes thereby to detect the signal transmitted from the electronic apparatus. Patent Document 2 discloses an example of an active stylus that receives a signal transmitted from a sensor controller.

A sensor board for detecting an active stylus frequently serves also as a sensor board for detecting a touch of a finger therewith. An electronic apparatus is configured such that a single sensor board for performing detection of a touch of a finger and detection of an active stylus is placed on a liquid crystal panel supplied from a display maker. A system in which a sensor board for performing detection of an active stylus is placed outside a liquid crystal panel in this manner is referred to as system of the "out cell type" for the convenience of description.

It is known that, even where a sensor board exists outside a liquid crystal panel as in a system of the out cell type, a driving signal in the liquid crystal panel existing below the sensor board makes a noise and has an influence on a detection action of a finger by the sensor controller or on a detection action of the active stylus. A representative one of types of such noise is an alternating current component of a voltage signal supplied to an electrode for driving a pixel of the liquid crystal panel. The voltage signal is used to control the orientation of the liquid crystal in each pixel, and enters an electrode group that configure the sensor board through alternating current (AC) coupling and makes noise.

A disclosure is known in which a countermeasure against such noise is performed solely by a sensor controller. Patent Document 3 discloses that a signal from which noise is cancelled can be obtained by a differential signal between a signal detected by an electrode in touch detection of a finger and a signal detected by a dummy electrode provided around the electrode and including a noise component. Patent Document 4 discloses a method in which a horizontal synchronizing pulse of a display apparatus is generated in a known cycle while the phase thereof is controlled and a position signal or a data signal from a finger or a stylus is detected from a timing synchronized with the pulse. Further, Patent Document 2 discloses that a stylus measures the level of a reception signal and a signal and a noise are identified from each other on the basis of a time length of a period within which the level is high.

Further, in recent years, a liquid crystal panel that performs touch detection of a finger of the on cell type or the in cell type has become popular (refer to Non-Patent Document 1). In the liquid crystal panel of the on cell type, an electrode group for a touch sensor is arranged on a color filter glass plate or a substrate glass plate in the inside of the liquid crystal panel, and electrodes configuring the liquid crystal panel and electrodes configuring the sensor board are separate electrodes. Since the distance between the electrodes is smaller than that of the out cell type described hereinabove, the electrodes for the touch sensor are influenced significantly by noise from the electrodes for liquid crystal driving.

On the other hand, in a liquid crystal panel of the in cell type, a common electrode or a pixel electrode (hereinafter referred to as commonly used electrode) of the liquid crystal panel is used as part of an electrode group for touch detection of a finger or for detection of an active stylus. While a driving action of pixels is performed in the liquid crystal panel, the potential of the commonly used electrode that is used commonly also for touch detection is set to a potential for pixel driving (which may be fixed or may be variable). Accordingly, in the liquid crystal panel of the in cell type, in the first place, while a driving action of pixels is being performed, the sensor controller cannot receive a signal from the active stylus.

PRIOR ART DOCUMENTS

Patent Documents

Patent Document 1: PCT Patent Publication No. WO2015/111159

Patent Document 2: U.S. Patent Application Publication No. 2013/0106797

Patent Document 3: Japanese Patent Laid-Open No. 1993-6153

Patent Document 4: PCT Patent Publication No. WO2015/141349

Non-Patent Document

Non-Patent Document 1: "In cell/on cell strategy for smartphones of JDI, LG, Sharp is read," [online], Nikkei Technology Online, [searched on Mar. 8, 2016], Internet <URL: http://techon.nikkeibp.co.jp/article/NEWS/20150121/400160/>

BRIEF SUMMARY

Technical Problem

In detection of a touch of a finger, even if a sensor controller solely stops a detection action of a touch of a finger within a period within which much noise is generated in a system of the out cell type (or of the on cell type) or within a liquid crystal driving period of a liquid crystal panel of the in cell type (those periods are hereinafter referred to each as "display refresh period"), although a detection rate of a position signal drops, missing of information does not occur. This is because, as long as a finger exists on the sensor board exceeding a single display refresh period equal to or smaller than several milliseconds, information indicating that a finger exists (or does not exist) does not suffer from missing.

However, if, in detection of an active stylus that transmits a data signal modulated with data of a writing pressure value, a unique ID or the like, the sensor controller uniquely stops a detection action within the period in response to a generation situation of liquid crystal noise or an action situation thereof, then a case occurs in which part of information transmitted from the active stylus within the period cannot occasionally be transmitted. For example, when the active stylus continues to repetitively transmit a position signal and a data signal like the active stylus disclosed in Patent Document 1, if the data signal is received within a display refresh period, then part of data included in the data signal will miss.

Especially, a sensor controller in which an electrode commonly used with a touch sensor is provided in the inside of a liquid crystal panel of the in cell type and is utilized comes to have an increased variety in regard to an appearance frequency and a length of a display refresh period in response to an action mode of the liquid crystal panel, a refresh rate, various action modes regarding in which region a commonly used electrode is used for driving of a pixel and so forth, settings, and a configuration of electrodes. Further, similarly to a liquid crystal panel of the in cell type, within what period a display refresh period appears in display panels such as an organic electroluminescence (EL) panel in which some of driving electrodes are commonly used with a touch sensor or a display panel of a special shape used together with a digital signage or the like depends upon a configuration and action of the display panels.

In order to make it possible for a sensor controller, which is incorporated in a system that uses a display panel of the in cell type or a display panel that acts in various display refresh periods, to detect a signal transmitted from an active stylus, which is in a pen down operation state, as soon as possible and receive information of a writing pressure and so forth put on a data signal without missing in the future, it is desirable to make it possible to transmit a preferable transmission timing for a signal in response to a refresh or a setting state of the display panel from the sensor controller to the active stylus such that the active stylus can transmit a predetermined signal avoiding a display refresh period unique to the display panel.

Accordingly, one object of the present disclosure resides in provision of a method in which an active stylus and a sensor controller are used, a system, a sensor controller, and an active stylus by which a preferable transmission timing of a signal according to a refresh state of a display panel can be conveyed from a sensor controller to an active stylus.

Technical Solution

A method according to the present disclosure in which a sensor controller is connected to a sensor having an electrode group provided together with a display panel configured to operate in a variable refresh cycle among a plurality of refresh cycles, and an active stylus performs bidirectional communication with the sensor controller. According to the method, the sensor controller acquires a present refresh cycle among the plurality of refresh cycles of the display panel, generates an uplink signal, which serves as a reference for synchronization corresponding to the acquired refresh cycle, and transmits the uplink signal to the active stylus, which is not detected as yet or is detected already, at the present refresh cycle.

A system according to the present disclosure includes a sensor controller connected to a sensor having an electrode group provided together with a display panel configured to operate in a variable refresh cycle among a plurality of refresh cycles, and an active stylus that performs bidirectional communication with the sensor controller. The sensor controller transmits an uplink signal, which serves as a reference for synchronization corresponding to the present refresh cycle among the plurality of refresh cycles of the display panel and serves as a reference that designates a time point at which the active stylus is to transmit a downlink signal, to the active stylus that is not detected as yet or is detected already at the refresh cycle. The active stylus, in operation, detects the uplink signal, transmits the downlink signal at the time point designated by the reference included in the detected uplink signal. The sensor controller detects the active stylus by detecting the downlink signal.

A sensor controller according to the present disclosure is connected to a sensor having an electrode group provided together with a display panel configured to operate in a variable refresh cycle among a plurality of refresh cycles and perform bidirectional communication with an active stylus. The sensor controller includes a transmission circuit, and a control circuit that, in operation, specifies a present refresh cycle among the plurality of refresh cycles of the display panel and causes the transmission circuit to transmit an uplink signal, which serves as a reference for synchronization of a transmission of a downlink signal corresponding to the specified refresh cycle, to the active stylus.

An active stylus according to the present disclosure performs bidirectional communication with a sensor controller connected to a sensor having an electrode group provided together with a display panel that displays images during a plurality of refresh cycles. The active stylus includes a reception circuit that, in operation, receives from the sensor controller an uplink signal that serves as makes a reference for synchronization transmitted repetitively at a present refresh cycle among the plurality of refresh cycles of the display panel, and a transmission circuit that, in operation, transmits a downlink signal to the sensor controller at a time point designated by the uplink signal.

Advantageous Effect

According to the present disclosure, since the sensor controller acquires a signal indicating a present refresh cycle of the display panel, it is possible to transmit, from the sensor controller to the active stylus, an uplink signal that serves as a reference to synchronization corresponding to the refresh cycle indicated by the acquired signal. Accordingly, to the active stylus that sends back a downlink signal at a timing designated as a reference time point for synchronization given by the uplink signal or transmits a downlink signal cyclically, a preferable transmission timing for a signal according to a state of the display panel can be conveyed.

BRIEF DESCRIPTION OF DRAWINGS

FIG. 1 is a schematic view of a position inputting system 1 according to a first embodiment of the present disclosure.

FIG. 7 is a view depicting a relationship between a refresh rate Rr of the liquid crystal panel 33 and a transmission cycle of an uplink signal US.

FIGS. 14A and 14B are views depicting particular examples of data transmitted within a time period secured for transmitting a data signal OD_DP.

MODES FOR CARRYING OUT THE DISCLOSURE

Figure 2:
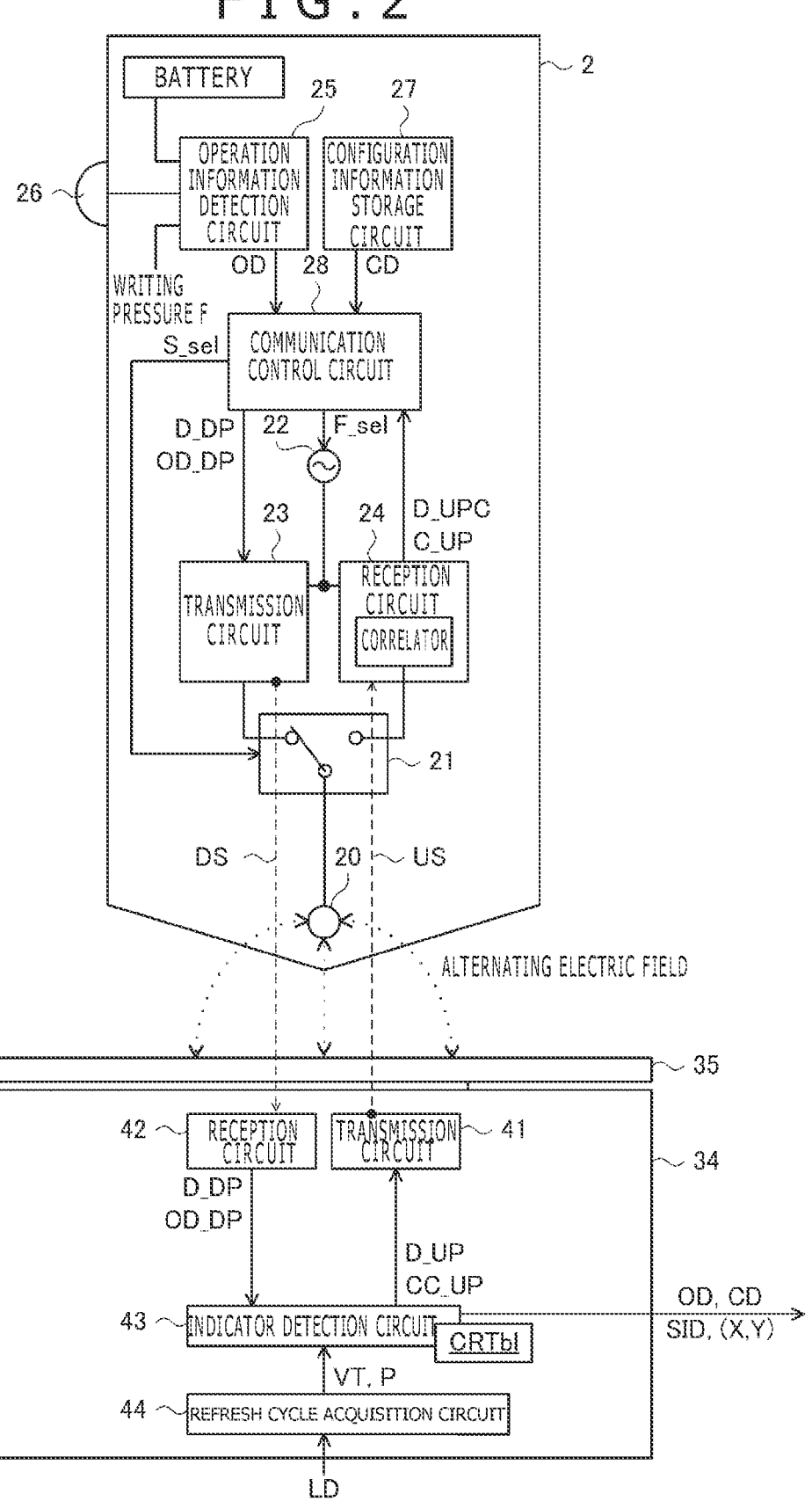
FIG. 2 is a schematic block diagram depicting functional blocks of a stylus 2 depicted in FIG. 1.

In the following, embodiments of the present disclosure are described in detail with reference to the accompanying drawings. First, as a first embodiment, a case in which the present disclosure is applied to a system of the out cell type is described. Thereafter, as a second embodiment, a case in which the present disclosure is applied to a system of the in cell type is described.

FIG. 1 is a schematic view of a position inputting system 1 according to the first embodiment of the present disclosure. The position inputting system 1 is a system that utilizes a stylus of the active capacitive type. The position inputting system 1 is configured including a stylus 2 (active stylus) for inputting an indication position P (P0 through Pk through Pn) and operation state data OD of a writing pressure and so forth to the electronic apparatus 3, and a sensor controller 31 that derives an indication position P of the stylus 2 at present using a sensor board 34 placed on the liquid crystal panel 33 and outputs the indication position P to an electronic apparatus control circuit 30 together with the operation state data OD. The sensor controller 31 is provided in the electronic apparatus 3 that includes a liquid crystal panel 33 and a liquid crystal driving circuit 32, and an electronic apparatus control circuit 30 that controls the liquid crystal panel 33 and the liquid crystal driving circuit 32.

The stylus 2 is a stylus of the active capacitive type including a power supply, a communication circuit and electrodes for detecting an uplink signal US transmitted in a predetermined cycle from the sensor controller 31 and transmitting a downlink signal DS at a time point indicated as a reference time point given by the detected uplink signal US. The indicated time point is either (1) a time point designated in advance before the sensor controller 31 detects the stylus 2 (hereinafter determined as time point immediately after the uplink signal US) or, after the stylus 2 and the sensor controller 31 detect each other, (2) a time point designated expressly as a reference time point given by the uplink signal US in accordance with a command CC_UP included in the uplink signal US.

The downlink signal DS includes a position signal D_DP indicating that the stylus 2 exists at a position at which it is detected and a data signal OD_DP modulated with data such as operation state data OD or the like such as writing pressure information. The position signal D_DP is utilized also as a response signal with which the stylus 2 responds to an uplink signal US hereinafter described transmitted from the sensor controller 31 to allow the sensor controller 31 to detect the stylus 2. In the following description, where the position signal D_DP and the data signal OD_DP are not distinguished from each other, they are collectively referred to as downlink signal DS.

The sensor controller 31 is an integrated circuit (IC) that is connected to the sensor board 34 provided in an opposing relationship to the liquid crystal panel 33 in a normal direction to the liquid crystal panel 33 and performs communication with the stylus 2 through the sensor board 34. The sensor controller 31 manages the cycle and the time period for transmitting an uplink signal US on the basis of a refresh state of the liquid crystal driving circuit 32, transmits an uplink signal US in accordance with the cycle and the time period, and detects a downlink signal DS transmitted at a reference time point given by the uplink signal US, thereby detecting the stylus 2. Further, the sensor controller 31 derives an indication position P of the stylus 2 on the basis of the detection position, extracts operation state data OD of a writing pressure and so forth from data included in the data signal OD_DP and supplies the operation state data OD to the electronic apparatus control circuit 30 together with the indication position P.

The liquid crystal panel 33 includes a plurality of pixels arranged in a matrix along two directions in which a panel face is formed (an X direction and a Y direction depicted in FIG. 1). Each pixel is configured including a pixel electrode and liquid crystal. The liquid crystal panel 33 is configured further including a polarizer, a glass substrate, a color filter, a common electrode, a backlight light source and so forth. Among the components mentioned, the common electrode is provided for each region where the panel face is divided into a plurality of regions, and within a display refresh period, a fixed or variable voltage is applied to the common electrode such that a potential difference according to a value of a pixel is formed between the common electrode and the pixel electrode.

The liquid crystal driving circuit 32 generates a driving signal LD (gate-source voltage or the like) on the basis of a video signal V supplied from the electronic apparatus control circuit 30. The driving signal LD plays a role of controlling polarization of liquid crystal of each pixel in the liquid crystal panel 33 to display a video image according to the video signal V. The driving signal LD includes a component of a high frequency, and every time the driving signal LD is supplied to the liquid crystal panel 33, liquid crystal noise LCDnz is included also in a signal to be received by the sensor controller 31 through a parasitic capacitance (represented by C2 in FIG. 1) formed between the liquid crystal panel 33 and the sensor board 34.

Now, an outline of action of the position inputting system 1 is described in light of a typical operation method of the stylus 2 by a user.

When the stylus 2 is to be operated, the user would perform an operation for moving the stylus 2 toward an operation panel 35 (pen down operation). The movement of the stylus 2 by the pen down operation is a space movement including a component in a normal direction to the operation panel 35 (Z direction depicted in FIG. 1). When the stylus 2 comes near to the sensor board 34 in the proximity of an indication position P0 as depicted in FIG. 1, a sufficient coupling capacitance C for transmitting and receiving a signal is formed between an electrode group configuring the sensor board 34 and a tip of the stylus 2. The stylus 2 is enabled to detect an uplink signal US transmitted from the sensor controller 31 through the coupling capacitance C. The stylus 2 performs an internal process for synchronizing with the uplink signal US and transmits a downlink signal DS at a time point designated by the sensor controller 31 with reference to a reference time point given by the uplink signal US (for example, at a time point immediately after the reference time point). If the sensor controller 31 successfully receives a downlink signal DS transmitted from the stylus 2 without being influenced by noise LCDnz or the like, then the sensor controller 31 can start processes for detection of the stylus 2, derivation of the indication position P and so forth.

After the pen down operation, the user would move the tip of the stylus 2 in such a manner as to draw a locus Path, for example, from P0 to Pn depicted in FIG. 1 in a state in which the tip of the stylus 2 is kept in contact with the operation panel 35. During the period, the stylus 2 repeats transmission of a position signal D_DP and a data signal OD_DP at each time point indicated on the basis of the reference time point given by the uplink signal US. Within the period, the value of the coupling capacitance C has a comparatively high value in comparison with that upon pen down.

The user would perform an operation for removing the tip of the stylus 2 from the operation panel 35 (pen up operation). The pen up operation is an operation reverse to the pen down operation. If the sensor controller 31 and the stylus 2 are spaced away from each other to such a degree that a sufficient coupling capacitance C is not formed any more in the proximity of the indication position Pn, then transfer of a signal between the stylus 2 and the sensor controller 31 is disabled. Even after the transfer is disabled, for a fixed time period, the reference time point and the cycle are maintained as an internal state of each of the stylus 2 and the sensor controller 31. After the fixed time period elapses, the reference time point as an internal state of each the stylus 2 and the sensor controller 31 is canceled.

If the sensor controller 31 fails to detect a downlink signal DS transmitted from the stylus 2 because of liquid crystal noise LCDnz although the stylus 2 undergoes a pen down operation and exists within a detectable range irrespective of whether this is caused by the fact that the stylus 2 cannot detect an uplink signal US or by the fact that a downlink signal DS sent back from the stylus 2 cannot be detected by the sensor controller 31, then the time point at which the sensor controller 31 detects the stylus 2 is delayed at least to next transmission of an uplink signal US.

That detection of the stylus 2 by the sensor controller 31 is delayed causes a delay of succeeding processes such as, for example, a coordinate detection process by the sensor controller 31, a cursor displaying process of a coordinate position by the electronic apparatus control circuit 30 and so forth. Here, the time point at which the stylus 2 performs the pen down operation is a time point at which the user starts utilization of the stylus 2 on the operation panel 35, and the delay of a succeeding displaying process causes a response delay of the position inputting system 1, which is experienced by the user.

Therefore, it is an object of the present embodiment that, when the user performs a pen down operation of the stylus 2 until the stylus 2 enters the detectable range of the sensor controller 31, the sensor controller 31 can detect the stylus 2 at an early stage with a higher probability.

In particular, the sensor controller 31 transmits an uplink signal US in a cycle (refresh cycle VT) of a refresh of the liquid crystal panel 33 to the stylus 2 such that a downlink signal DS is transmitted from the stylus 2 after every generation cycle of a blank period BP within which the amount of the liquid crystal noise LCDnz is comparatively small.

FIG. 2 is a schematic block diagram depicting function blocks of the stylus 2. As depicted in FIG. 2, the stylus 2 is configured including an electrode 20, a transmission/reception switching circuit 21, an oscillation circuit 22, a transmission circuit 23, a reception circuit 24, an operation information detection circuit 25, an operation inputting circuit 26, a configuration information storage device 27, and a communication control circuit 28.

The electrode 20 is a conductor in which charge corresponding to a downlink signal DS or an uplink signal US is induced. The transmission/reception switching circuit 21 is a switch for switching a connection state between the electrode 20 and the transmission circuit 23 or the reception circuit 24 on the basis of a switching signal S_sel supplied from the communication control circuit 28. The transmission/reception switching circuit 21 is used to perform switching between transmission and reception time-divisionally.

The oscillation circuit 22 is an oscillation circuit that generates a carrier signal of a frequency to be used for communication between the sensor controller 31 and the stylus 2 on the basis of a frequency setting signal F_sel supplied from the communication control circuit 28. The carrier signal may be a sine wave or a rectangular wave of a clock pulse.

The reception circuit 24 is configured such that it extracts a search pattern D_UP or a command CC_UP included in a signal by detecting and demodulating a variation (signal) of a charge amount induced in the electrode 20 and outputs the extracted search pattern D_UP or command CC_UP to the communication control circuit 28. Where modulation using a spread code is performed (details are hereinafter described in connection with the second embodiment) as a modulation method for the uplink signal US, a correlation arithmetic operation between a received signal and a spread code stored in advance is performed by a correlator to extract a search pattern D_UP or a command CC_UP.

The transmission circuit 23 generates a downlink signal DS on the basis of data supplied from the communication control circuit 28 and supplies the downlink signal DS to the electrode 20 thereby to transmit the downlink signal DS to the sensor controller 31. When a position signal D_DP is to be transmitted, a carrier signal provided from the oscillation circuit 22 is outputted as it is without being modulated. When a data signal OD_DP is to be transmitted, data such as the operation state data OD, configuration data CD or the like is encoded to generate a transmission digital signal, and a carrier signal provided from the oscillation circuit 22 is modulated with the transmission digital signal to generate a data signal OD_DP.

The operation information detection circuit 25 acquires operation state data OD that is dynamic data that varies in response to an operation state of the stylus 2 such as an operation state such as on/off of the operation inputting circuit 26 that is a pushbutton or the like provided on a side face of the stylus 2, a value of a writing pressure F detected by a writing pressure detection circuit not detected or remaining amount data of a battery serving as a driving power supply for the stylus 2, and suitably supplies the operation state data OD to the communication control circuit 28.

The configuration information storage device 27 holds, in addition to a stylus identifier SID, configuration data CD that is static data that does not vary in response to an operation state of the stylus 2 such as a vendor ID indicative of a maker of the stylus 2, a type of the pen tip of the stylus 2 (ballpoint pen, brush or the like), the number of operation inputting circuits 26 and so forth and supplies the configuration data CD to the communication control circuit 28.

The communication control circuit 28 controls the transmission circuit 23 such that a downlink signal DS is transmitted at a time point indicated by the sensor controller 31 with reference to a reference time point given by a reception time point of an uplink signal US detected by the reception circuit 24 after a pen down operation is started. The indicated time point is, within a time period until the sensor controller 31 completes detection of a stylus 2, (1) a time point determined in advance between the stylus 2 and the sensor controller 31, and particularly a time point immediately after an uplink signal US including a search pattern D_UP is detected (a switching gap between transmission and reception may be interposed). On the other hand, after the sensor controller 31 detects a stylus 2, the indicated point of time is a time point designated expressly with reference to a reference time point given by the uplink signal US by a command CC_UP included in the uplink signal US. In the case of (2), the communication control circuit 28 controls the transmission circuit 23 to transmit a data signal OD_DP including data designated by the command CC_UP (including operation state data OD or configuration data CD). Further, the communication control circuit 28 holds a communication setting table and holds a timing of a reference time point detected once, a time period to be used for communication (time slot or the like), a frequency or the like.

Figure 3:
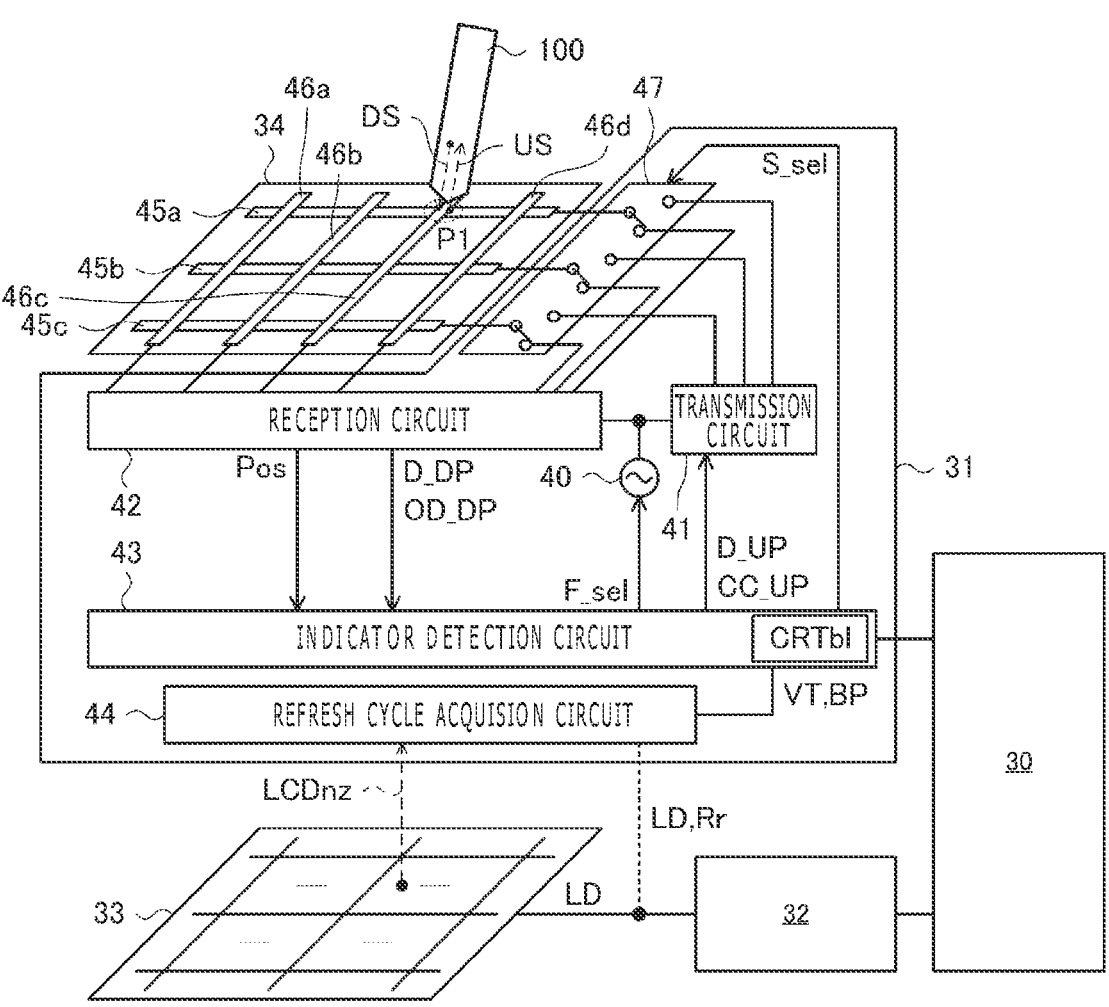
FIG. 3 is a schematic block diagram depicting functional blocks of a sensor controller 31 depicted in FIG. 1.

FIG. 3 is a schematic block diagram depicting function blocks of the sensor controller 31. The system of the present embodiment corresponds to that of the out cell type. The sensor board 34 is placed outside (above) the liquid crystal panel 33 with a transparent adhesive layer or the like interposed therebetween.

The sensor board 34 includes a row electrode group 45 and a column electrode group 46 arranged two-dimensionally in such a manner as to form a plane parallel to the operation panel 35 depicted in FIG. 1. The row electrode group 45 and the column electrode group 46 are provided separately from the electrodes that configure the liquid crystal panel 33 (pixel electrodes and common electrodes). A signal appearing in the row electrode group 45 includes liquid crystal noise LCDnz generated in the liquid crystal panel 33.

The sensor controller 31 is an integrated circuit connected to the sensor board 34 and is configured, as depicted in FIG. 3, including a transmission/reception switching circuit 47, an oscillation circuit 40, a transmission circuit 41, a reception circuit 42, an indicator detection circuit 43, and a refresh cycle acquisition circuit 44.

The transmission/reception switching circuit 47 is a switch group for switching a connection state between the electrodes configuring the row electrode group 45 and the transmission circuit 41 or the reception circuit 42 hereinafter described on the basis of a switching signal S_sel supplied from the indicator detection circuit 43. The switching signal S_sel is a signal for instructing, within a time period within which the indicator detection circuit 43 is to transmit an uplink signal US toward the stylus 2 (and when the indicator detection circuit 43 is to perform detection of a finger touch), the transmission/reception switching circuit 47 to connect the row electrode group 45 to the transmission circuit 41, but instructing, when the indicator detection circuit 43 is to receive a signal from the stylus 2, the transmission/reception switching circuit 47 to connect the row electrode group 45 to the reception circuit 42.

The oscillation circuit 40 is an oscillation circuit that generates a signal of a sine wave (or a rectangular wave) of a frequency based on a frequency setting signal F_sel supplied from the indicator detection circuit 43.

The transmission circuit 41 modulates a carrier signal provided from the oscillation circuit 40 with a search pattern D_UP and a command CC_UP supplied from the indicator detection circuit 43 at a timing indicated by the indicator detection circuit 43 and outputs an uplink signal US to the row electrode group 45.

The reception circuit 42 executes a reception action of a downlink signal DS of the indicator detection circuit 43 at a timing indicated by the indicator detection circuit 43. If a downlink signal DS is detected within a reception period, then the reception circuit 42 extracts operation state data OD and so forth included in a data signal OD_DP and supplies the operation state data OD to the indicator detection circuit 43, and acquires position information Pos indicative of an electrode by which a downlink signal DS corresponding to the data signal OD_DP is received and supplies the position information Pos to the indicator detection circuit 43.

The refresh cycle acquisition circuit 44 is a functioning circuit that specifies, on the basis of a driving signal LD or a refresh rate Rr outputted from the liquid crystal driving circuit 32, a situation of the monitored liquid crystal noise LCDnz or the like, a refresh cycle VT (refer to FIG. 7) indicative of a cycle of control of the liquid crystal panel 33 by the liquid crystal driving circuit 32 and a blank period BP (refer to FIGS. 4 and 7) that is a period within which the appearance frequency of the liquid crystal noise LCDnz is reduced (becomes sparse in comparison with that within any other period) within the refresh cycle VT. The blank period BP is a period remaining when a display refresh period is removed from the refresh cycle VT corresponding to the refresh rate Rr and is, in the present embodiment, a vertical blanking period VB as hereinafter described with reference to FIG. 7.

In such a position inputting system of the out cell type as depicted in FIG. 3, the liquid crystal driving circuit 32 and the sensor controller 31 are configured from integrated circuits separate from each other designed independently of each other, and terminals for extracting the driving signal LD or the refresh rate Rr may not necessarily be provided on the liquid crystal driving circuit 32. Therefore, the refresh cycle acquisition circuit 44 receives supply of the driving signal LD or the refresh rate Rr from the liquid crystal driving circuit 32 when this is possible and extracts a refresh cycle VT and a blank period BP from the driving signal LD or the refresh rate Rr but detects, when it cannot receive supply of the driving signal LD or the refresh rate Rr from the liquid crystal driving circuit 32, it monitors the liquid crystal noise LCDnz to detect the density of the liquid crystal noise LCDnz thereby to extract a refresh cycle VT and a blank period BP.

The indicator detection circuit 43 allocates a communication resource for detecting a stylus 2 not detected as yet within a refresh cycle VT and a blank period BP acquired by the refresh cycle acquisition circuit 44 and stores the communication resource into a communication resource table CRTb1. Further, the indicator detection circuit 43 performs control for transmitting an uplink signal US including a search pattern D_UP for each refresh cycle VT using the allocated communication resource.

The search pattern D_UP is data including a bit pattern known to the stylus 2 and is data in which 0 or 1 successively appears or 0 and 1 repetitively appear alternately. If the uplink signal US generated by modulation with the search pattern D_UP is a signal that provides a reference timing for synchronization to the stylus 2 that is to detect the uplink signal US, then the bit length or the substance of the search pattern D_UP does not matter. The uplink signal US that includes a search pattern D_UP including one bit or a plurality of bits makes a signal for instructing the stylus 2 to transmit a downlink signal DS immediately with reference to a reference time point given by the reception time point of the uplink signal US.

The indicator detection circuit 43 may determine, on the basis of action mode information indicative of the refresh cycle VT and the blank period BP extracted by the refresh cycle acquisition circuit 44 or the like, one transmission cycle from among transmission cycles of a finite number of uplink signals US set in advance for the action mode information or the like (cycle of a time slot S0). The transmission cycle of the uplink signal US determined from among the plurality of refresh cycles VT in this manner makes one component of communication resources stored in the communication resource table CRTb1 in addition to the blank period BP.

The indicator detection circuit 43 allocates, after it detects a stylus 2, a time period within which a position signal D_DP and a data signal OD_DP are to be transmitted to the stylus 2 detected already and stores the time period into the communication resource table CRTb1. Further, the indicator detection circuit 43 transmits an uplink signal US that includes the command CC_UP for indicating the substance of data to be transmitted such as the position signal D_DP, the data signal OD_DP or the like and a timing at which the signals are to be transmitted from the stylus 2 (timing determined with reference to the reception timing of the uplink signal US) to the stylus 2.

Figure 4:
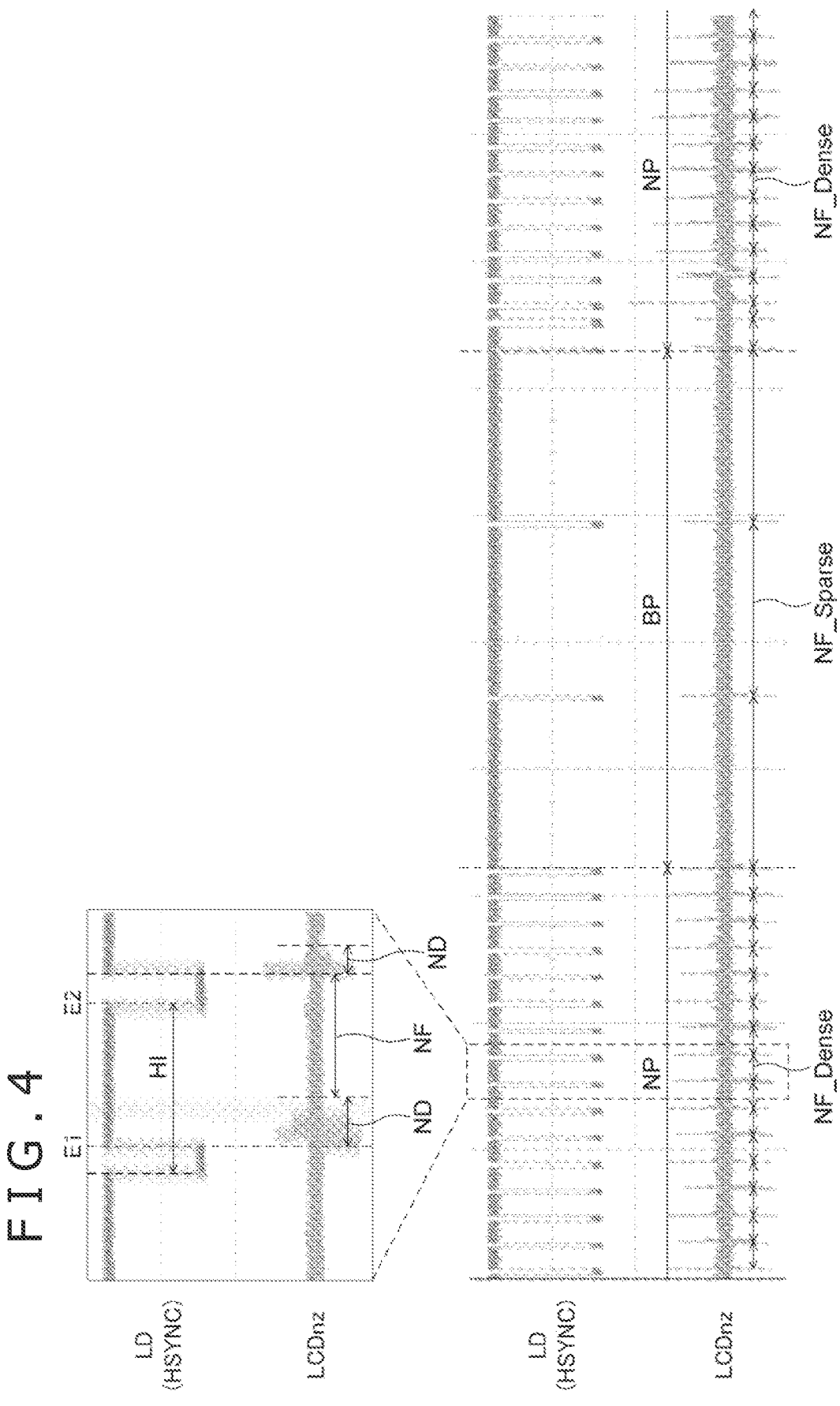
FIG. 4 is a view illustrating an example of a relationship between a driving signal LD and liquid crystal noise LCDnz depicted in FIG. 1.

FIG. 4 is a view illustrating an example of a relationship between the driving signal LD and the liquid crystal noise LCDnz in a certain one liquid crystal panel 33. A view at the upper side in FIG. 4 is a partial enlarged view of a signal waveform diagram depicted at the lower side.

The signal waveform diagram of FIG. 4 depicts an example of a result of measurement of waveforms of a horizontal synchronizing signal HSYNC that is a kind of a driving signal LD and liquid crystal noise LCDnz detected on the sensor board 34 in response to the horizontal synchronizing signal HSYNC. In FIG. 4, the axis of abscissa indicates the time, and the axis of ordinate indicates the level of a signal.

The horizontal synchronizing signal HSYNC typically is a signal that conveys a start and an end of a display period when a belt-shaped video image line is displayed on the liquid crystal panel 33 and is a signal in which a rising edge E1 and a falling edge E2 repetitively appear in a horizontal synchronization cycle HI as illustrated in a view at the upper side in FIG. 4. The rising edge E1 indicates a start of a display period, and the falling edge E2 indicates an end of a display period.

As described hereinabove, a high frequency component of the driving signal LD becomes liquid crystal noise LCDnz to the sensor board 34. Since the rising edge E1 and the falling edge E2 are locations at which the horizontal synchronizing signal HSYNC has a high frequency, liquid crystal noise LCDnz is generated at the edges as depicted in the view at the upper side in FIG. 4. More particularly, a state in which the liquid crystal noise LCDnz is great continues over an arbitrary noise period ND from each the rising edge E1 and the falling edge E2. In contrast, within a period between adjacent noise periods ND, namely, within a noise-free period NF depicted in FIG. 4, the level of the liquid crystal noise LCDnz is so small that it can be ignored.

The horizontal synchronization cycle HI is variable and sometimes indicates a generally long period or a generally short period as depicted in a view at the lower side in FIG. 4. This arises from the fact that a non-displaying area is provided at part of the liquid crystal panel 33. In the following, this is described in detail with reference to FIG. 5.

Figure 5:
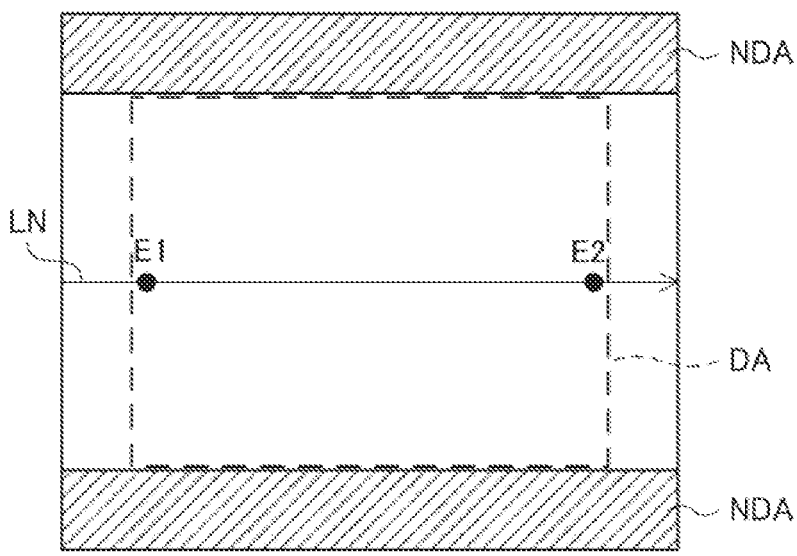
FIG. 5 is a view depicting a display face of a liquid crystal panel 33 depicted in FIG. 1.

FIG. 5 is a view depicting a display face of the liquid crystal panel 33. An outer frame in FIG. 5 indicates the whole display face, and a frame of a broken line indicates a display area DA in which a video image is to be displayed effectively. A region between an outer edge of the display face and the display area DA is a non-displaying area in which a video image is not actually displayed although it is included in the display face. Portions of the non-displaying area above and below the display area DA are particularly indicated in FIG. 5 as vertical direction non-displaying areas NDA by slanting lines. At least in the liquid crystal panel 33 fabricated at present, such a non-displaying area inevitably appears. The horizontal synchronization cycle HI is relatively short when the liquid crystal driving circuit 32 is generating a horizontal synchronizing signal HSYNC corresponding to the display area DA but is relatively long while the liquid crystal driving circuit 32 is generating a horizontal synchronizing signal HSYNC corresponding to each vertical direction non-displaying area NDA (within a vertical blanking period VB (Vertical Blanking)).

In the example of the liquid crystal panel 33 indicated by the example in FIG. 4, the noise-free period NF is relatively short (noise-free period NF_Dense depicted) while the liquid crystal driving circuit 32 is generating a horizontal synchronizing signal HSYNC corresponding to the display area DA but is relatively long (noise-free period NF_Sparse depicted) while the liquid crystal driving circuit 32 is generating a horizontal synchronizing signal HSYNC corresponding to each vertical direction non-displaying area NDA. In such a liquid crystal panel 33 as just described, within a frame period of one image, a noise period NP (display refresh period) within which the generation frequency of liquid crystal noise LCDnz is relatively high and at least one blank period BP (period within which the generation frequency of liquid crystal noise LCDnz is relatively low) exist.

Here, in the example of the liquid crystal panel 33 of FIG. 4, the level of the horizontal synchronizing signal HSYNC within the blank period BP indicates a generally high (High) state. However, this is an example to the last, and also an example in which the level of the horizontal synchronizing signal HSYNC within the blank period BP becomes a low (Low) state exists.

Figure 6:
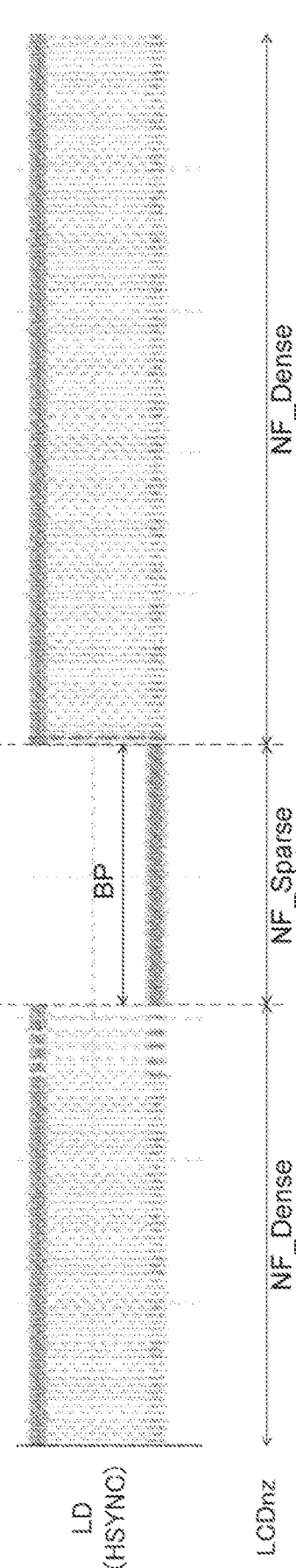
FIG. 6 is a view illustrating another example of the relationship between the driving signal LD and the liquid crystal noise LCDnz depicted in FIG. 1.

FIG. 6 is a view illustrating a relationship between the driving signal LD and the liquid crystal noise LCDnz in such an example as just described. Also in this example, similarly as in the example in FIG. 4, a period within which the noise-free period NF becomes a noise-free period NF_Dense corresponding to the display area DA and a period within which the noise-free period NF becomes a noise-free period NF_Sparse corresponding to a vertical direction non-displaying area NDA appear alternately as viewed on the time axis. The latter corresponds to a blank period BP in which the liquid crystal noise LCDnz is relatively small. Further, the level of the horizontal synchronizing signal HSYNC within the blank period BP is low (Low) as depicted in FIG. 6.

Although the characteristics of the driving signal LD differs according to the type of the liquid crystal panel 33 in this manner, for the liquid crystal noise LCDnz detected by the sensor board 34, a noise period NP within which noise is generated relatively densely and a blank period BP within which noise is generated relatively sparsely exist in a cycle of the refresh rate Rr. Further, it is expected that, within a cycle of the refresh rate Rr, at least one blank period BP corresponding to the vertical blanking period VB exists. Here, the appearance interval and the duration of the blank period BP differ depending upon the refresh rate Rr set at present in the liquid crystal panel 33.

In the following description, the refresh cycle acquisition circuit 44 is configured such that it receives supply of a refresh rate Rr from the liquid crystal driving circuit 32 and selects one of a plurality of refresh cycles VT stored therein on the basis of a refresh rate Rr supplied thereto. Further, the indicator detection circuit 43 has stored therein a plurality of transmission cycles for an uplink signal US in advance as described hereinabove and selects one of the transmission periods in response to the refresh cycle VT selected by the refresh cycle acquisition circuit 44. Then, transmission of an uplink signal US is performed in accordance with the selected transmission cycle.

FIG. 7 is a view depicting a relationship between the refresh rate Rr of the liquid crystal panel 33 and the transmission cycle of the uplink signal US.

A period T_Rr1 depicted in FIG. 7 is a period within which the refresh rate Rr of the liquid crystal panel 33 is a first rate of 60 Hz (60 p). The refresh cycle VT of the liquid crystal panel 33 within this period is a first refresh cycle VT1. A particular value of the first refresh cycle VT1 is the reciprocal of the first rate and is, for example, where the first rate is 60 Hz, approximately 16.7 milliseconds. Images P1 to P4 indicate images displayed with this period. Further, a period T_Rr2 depicted in FIG. 7 is a period within which the refresh rate Rr of the liquid crystal panel 33 is, for example, a second rate of 48 Hz (48 p). The refresh cycle VT of the liquid crystal panel 33 within this period is a second refresh cycle VT2. A particular value of the second refresh cycle VT2 is the reciprocal of the second rate and is, for example, where the second rate is 48 Hz, approximately 20 milliseconds. Images P11 to P13 indicate images displayed within this period.

As can be recognized from FIG. 7, an image displayed on the liquid crystal panel 33 is updated in a cycle equal to the refresh cycle VT of the liquid crystal panel 33. Further, every time the image is updated, a blank period BP within which the occurrence interval of the liquid crystal noise LCDnz is sparse appears at least once. In FIG. 7, the blank periods BP corresponding to the images P1 to P4 and P11 to P13 are depicted as blank periods BP1 to BP4 and BP11 to BP13, respectively.

A communication resource table CRTb1 depicted at the lower side in FIG. 7 depicts a relationship between the refresh cycle VT and the transmission timing of the uplink signal US. In the communication resource table CRTb1, the horizontal direction indicates a time slot (however, only a portion is depicted schematically) and the vertical direction indicates a communication frequency.

The sensor controller 31 is configured such that it transmits an uplink signal US at a transmission timing 700 depicted in FIG. 7 in order to detect a stylus 2. In the example depicted in FIG. 7, the transmission timing 700 is transmitted using a time slot S0 in which a blank period BP exists from within each refresh cycle VT, and accordingly, the transmission cycle of the uplink signal US is equal to the refresh cycle VT. For example, within the period T_Rr1 within which the refresh cycle VT is the first refresh cycle VT1 (for example, approximately 16.7 milliseconds), also the transmission cycle of the uplink signal US is VT1 (for example, approximately 16.7 milliseconds), but within a period T_Rr2 within which the refresh cycle VT is the second refresh cycle VT2 (for example, approximately 20 milliseconds), also the transmission cycle of the uplink signal US is VT2 (for example, approximately 25 milliseconds). Though not depicted, where the refresh rate Rr is set such that the refresh cycle VT becomes shorter (for example, 120 Hz or 240 Hz), also the transmission cycle of the uplink signal US becomes a shorter value accordingly.

In FIG. 7, a period T_Rr_chng indicated between the period T_Rr1 and the period T_Rr2 indicates a time period that is required in order to change the refresh rate Rr from the first rate to the second rate. It is to be noted that such a change of the refresh rate Rr (cycle of a rendering timing) occurs, for example, when the action mode of the liquid crystal panel 33 is changed to a power saving mode or the like or when the generation rate fps of an image frame is raised in order to perform smoother display to raise the refresh rate Rr to 120 Hz, 240 Hz or the like.

Figure 8:
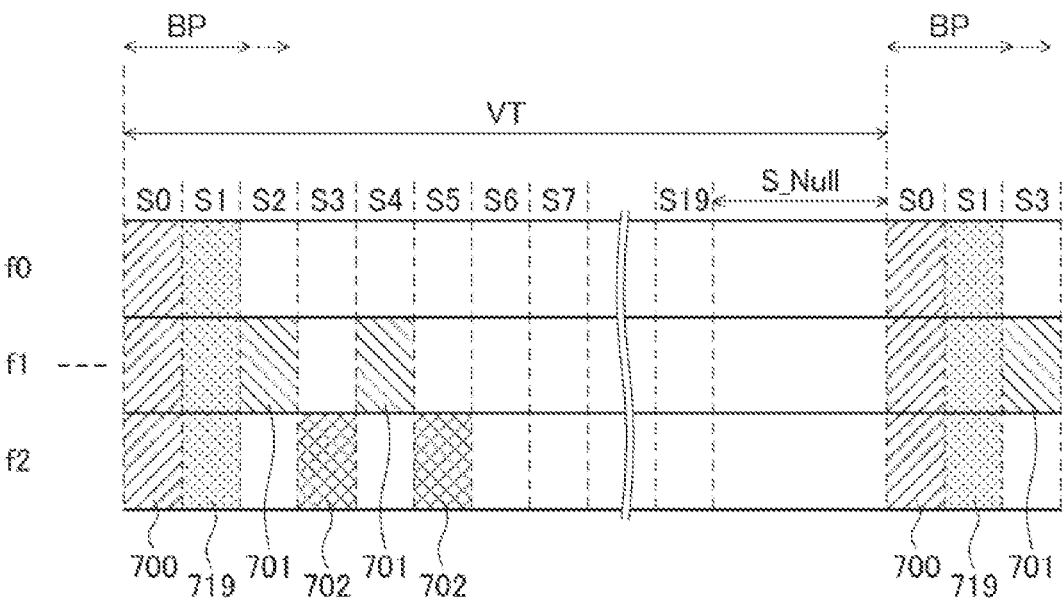
FIG. 8 is a table (communication resource table CRTb1) indicative of refresh cycles VT of the liquid crystal panel 33 and communication situations of the position inputting system 1.

FIG. 8 is a view illustrating an example of the communication resource table CRTb1 that indicates a refresh cycle VT of the liquid crystal panel 33 and a resource of communication allocated to a transmission or reception action in the position inputting system 1. In the example of FIG. 8, communication resources are managed by frequencies f0, f1, and f2 and 20 time slots S0 to S19 as an example. This slot number varies depending upon the refresh cycle VT.

FIG. 8 indicates a transmission timing 700 of an uplink signal US including a search pattern D_UP for detecting a stylus 2, a response timing 719 for allowing a stylus 2 not detected as yet to respond to an uplink signal US and transmission timings 701 and 702 for allowing a stylus 2 detected already to transmit a position signal D_DP or a data signal OD_DP including operation state data OD.

As depicted in FIGS. 8 and 7, the transmission timing 700 of the uplink signal US is given to the time slot S0 within the blank period BP. The cycle to which the transmission timing 700 is given (transmission cycle of the uplink signal US) varies depending upon the refresh rate Rr of the liquid crystal panel 33 and is determined once after the sensor controller 31 is activated or reset such that it coincides at least with one blank period BP. The sensor controller 31 performs transmission of an uplink signal US including a search pattern D_UP for a time period until a stylus 2 is detected using the time slot S0 corresponding to a blank period BP for each cycle of the refresh rate Rr.

The response timing 719 is a timing at which, after a stylus 2 detects an uplink signal US including a search pattern D_UP, it responds to the uplink signal US immediately after a reference time point given by the uplink signal US. The reason why the uplink signal US is given to the time slot S1 immediately after the uplink signal US is transmitted is that it is intended to cause the response timing 719 to be included in the blank period BP.

If a stylus 2 that is not detected by the sensor controller 31 as yet receives the uplink signal US through the time slot S0, then it transmits, as a response signal to the uplink signal US, a position signal D_DP, which is a downlink signal DS for indicating presence of the stylus 2 itself, through the time slot S1 immediately after then.

By fixedly setting the response timing 719 to the time slot S1 immediately after the time slot S0 through the uplink signal US is transmitted, transmission of the downlink signal DS can be induced such that the response signal is positioned within the blank period BP same as that of the time slot S0. Consequently, the sensor controller 31 that detects a stylus 2 by periodically transmitting an uplink signal US and detecting a downlink signal DS can obtain a downlink signal DS within a period that is not influenced by the liquid crystal noise LCDnz as soon as possible before the stylus 2 is brought into contact with the operation panel 35 on which the stylus 2 is being pen down operated. It is to be noted that, if the liquid crystal noise LCDnz is not influenced by detection of an uplink signal US by the stylus 2, then only the transmission timing 701 may be included in the blank period BP.

The transmission timing 701 indicates the time slot S2 or S4 expressly designated by a command CC_UP with reference to the reference time point (S0) given by the uplink signal US and the used efficiency f1 to the stylus 2 (2B) detected already. The transmission timing 702 indicates the time slot S3 or S5 expressly designated by the command CC_UP and the used frequency f2 to the stylus 2 (2C) detected already. The reason why a forward time slot as near as possible to a time point at which an uplink signal US is transmitted from among the 20 time slots S0 to S19 is used is that it is intended to perform such control that, even if only one blank period BP can be obtained within an a refresh cycle VT, a downlink signal DS from the stylus 2 is received at a time point that may be included in a blank period BP with possibility as high as possible.

The command CC_UP may include a type of a signal to be transmitted such that the data signal OD_DP is included in the time slot S2 and the position signal D_DP is included in the time slot S4.

Where a plurality of blank periods BP exist in one refresh cycle VT, an uplink signal US may be transmitted within at least one blank period BP to wait for a response of a downlink signal DS, and a command CC_UP may be transmitted such that a data signal OD_DP is transmitted within a different blank period BP.

As described above, according to the position inputting system 1, sensor controller 31 and stylus 2 as well as the method performed by them according to the present embodiment, since the sensor controller 31 acquires a refresh cycle VT at present of the liquid crystal panel 33, it is possible for the sensor controller 31 to transmit an uplink signal US, which makes a reference for synchronization corresponding to the acquired refresh cycle VT, to the stylus 2. Accordingly, it is possible to convey a preferable transmission timing of a signal according to a state of the liquid crystal panel 33 to the stylus 2, which sends back a downlink signal DS at a timing designated as the reference time point for synchronization given by the uplink signal US. Especially, a signal transmitted from the stylus 2 that is in a pen down operated state can be detected at an early stage within a period within which the detection is not influenced by an action of the liquid crystal panel 33.

Now, a second embodiment of the present disclosure is described. A principal difference between the position inputting system 1 of the present embodiment and the position inputting system 1 according to the first embodiment is that a row electrode group 45 of a sensor board 34 is used commonly as a common electrode of a liquid crystal panel 33, namely, that a sensor board 34 (or liquid crystal panel 33) of the in cell type is used. In the following, common constituent elements between the present embodiment and the first embodiment are denoted by like reference symbols and description of them is omitted, and description is given principally of the different of the present embodiment from the first embodiment.

Figure 9A:
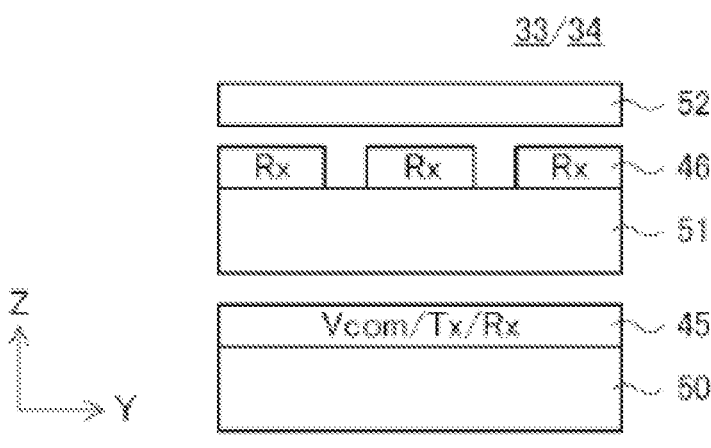
FIGS. 9A and 9B are schematic views depicting a structure of a liquid crystal panel 33 serving also as a sensor board 34 according to a second embodiment of the present disclosure.
Figure 9B:
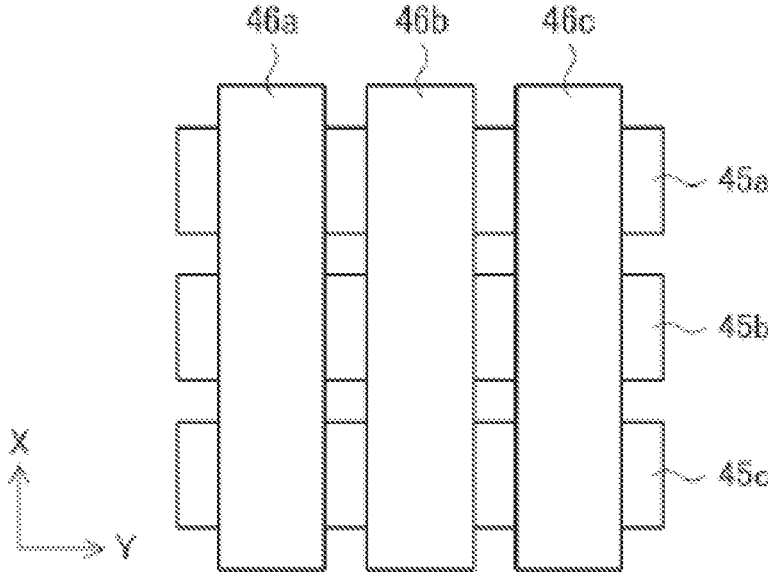

FIGS. 9A and 9B are a schematic views depicting a structure of the liquid crystal panel 33 serving also as the sensor board 34 according to the present embodiment. As depicted in FIG. 9A, the liquid crystal panel 33 serving also as the sensor board 34 has a row electrode group 45 formed on an upper face of a liquid crystal layer 50. As depicted in FIG. 9B, the row electrode group 45 is configured from a plurality of row electrodes 45a to 45c extending in a Y direction (one direction in a display face of the liquid crystal panel 33). It is to be noted that, although the tree row electrodes 45a to 45c are exemplified here, the row electrode group 45 is actually configured from a greater number of row electrodes.

The row electrode group 45 serves, when a signal is to be transmitted toward the stylus 2 and a finger touch is to be detected, as transmission electrodes (Tx), but serves, when a signal from the stylus 2 is to be received, as reception electrodes (Rx), as described in the first embodiment. Further, the row electrode group 45 serves also as common electrodes of the liquid crystal panel 33, and when the liquid crystal panel 33 is driven, a fixed potential Vcom is supplied to the row electrode group 45. The three roles described above of the row electrode group 45, namely, the role as the transmission electrodes (Tx), the role as the reception electrodes (Rx) and the role as common electrodes (Vcom) of the liquid crystal panel 33 are implemented by time divisionally.

As an upper layer on the row electrode group 45, a color filter glass plate 51 is arranged with a transparent insulating layer not depicted interposed therebetween, and the column electrode group 46 is arranged on an upper face of the color filter glass plate 51. As depicted in FIG. 9B, the column electrode group 46 is configured from a plurality of column electrodes 46a to 46c extending in an X direction (direction orthogonal to the Y direction in the display face of the liquid crystal panel 33). It is to be noted here that, although the three column electrodes 46a to 46c are exemplified, the column electrode group 46 is actually configured from a greater number of column electrodes. The column electrode group 46 does not serve as electrodes of the liquid crystal panel 33, but normally functions as reception electrodes (Rx) similarly to the column electrode group 46 described hereinabove in connection with the first embodiment. As an upper layer on the column electrode group 46, a polarizer 52 is arranged with a transparent insulating layer not depicted interposed therebetween.

Figure 10:
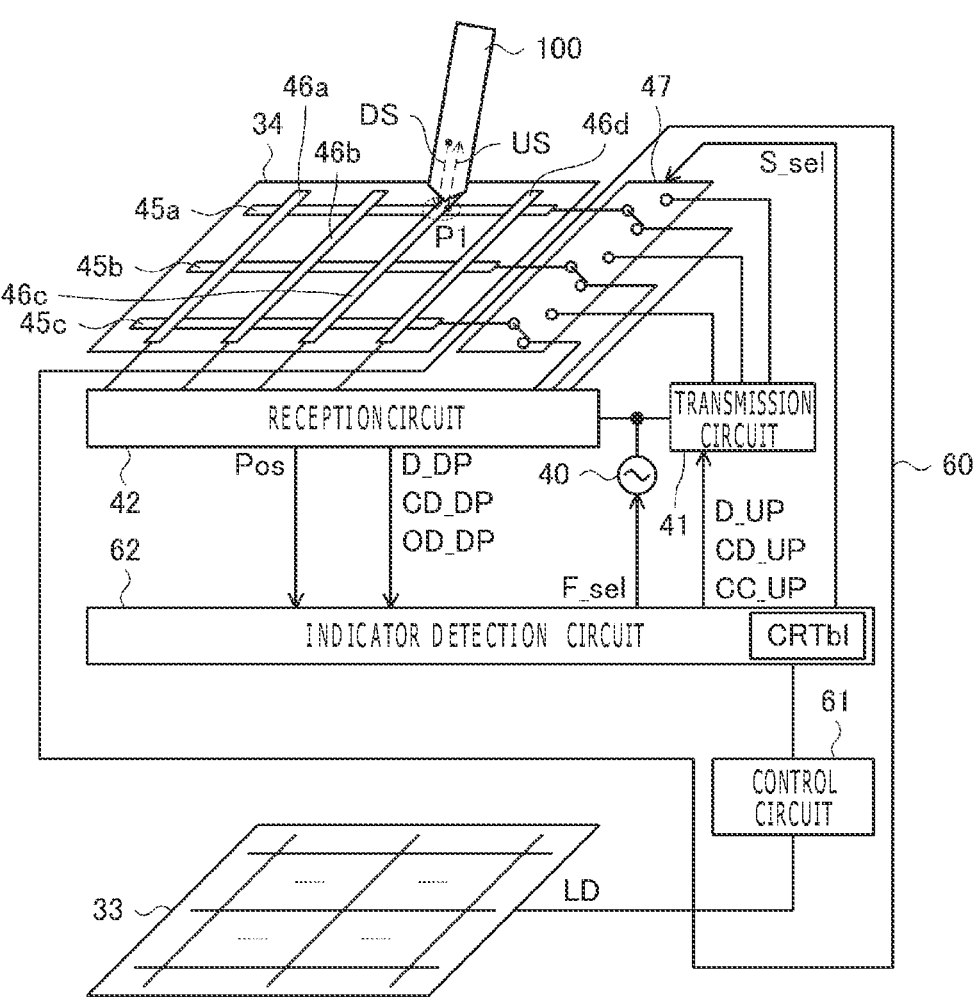
FIG. 10 is a schematic block diagram depicting functional blocks of a control device 60 according to the second embodiment of the present disclosure.

FIG. 10 is a schematic block diagram depicting function blocks of a control device 60 provided in the electronic apparatus 3 according to the present embodiment. As recognized through comparison of FIG. 10 with FIG. 3, in the electronic apparatus 3 according to the present embodiment, the sensor controller 31, liquid crystal driving circuit 32 and electronic apparatus control circuit 30 that are provided separately from each other in the first embodiment are incorporated as a single control device 60.

The control device 60 is configured including a control circuit 61 and an indicator detection circuit 62 in addition to the oscillation circuit 40, transmission circuit 41 and reception circuit 42 described hereinabove in connection with the first embodiment. The control circuit 61 first has functions of the electronic apparatus control circuit 30 and the liquid crystal driving circuit 32 described hereinabove in connection with the first embodiment. In particular, the control circuit 61 has a function for generating a driving signal LD described hereinabove on the basis of a video signal V obtained by reproducing a video image signal recorded, for example, on a storage medium not depicted and supplying the driving signal LD to the liquid crystal panel 33.

The control circuit 61 has also a function as a refresh cycle acquisition circuit 44 described hereinabove in connection with the first embodiment. In particular, the control circuit 61 has a function for extracting a refresh cycle VT indicative of a cycle of control of the liquid crystal panel 33 and a blank period BPa that is a period within which the appearance frequency of liquid crystal noise LCDnz is low. However, since, different from the refresh cycle acquisition circuit 44, the control circuit 61 itself generates a driving signal LD, the process for extracting a refresh cycle VT and a blank period BPa is completed inside the control circuit 61 and it is not necessary to monitor the liquid crystal noise LCDnz.

Therefore, the blank period BPa according to the present embodiment is a period different from the blank period BP in the first embodiment. In particular, as described hereinabove with reference to FIG. 5, the blank period BP in the first embodiment is a period within which the liquid crystal driving circuit 32 generates a driving signal LD corresponding to a vertical direction non-displaying area NDA and is a period corresponding to the vertical blanking period VB.

In contrast, the blank period BPa in the present embodiment is a period within which a driving process for a pixel is not performed within the latter half of a horizontal blanking period HB (Horizontal Blanking), namely, within a period within which the pixel of a driving target is returned from the right end to the left end of the screen. Since the blank period BPa is a very short time period in comparison with the blank period BP, this cannot be utilized effectively in the first embodiment in which the sensor board 34 of a system of the out cell type is implemented by an IC in which the sensor controller 31 and the liquid crystal driving circuit 32 are separate from each other. However, this can be utilized effectively in the present embodiment in which the sensor board 34 of a system of the in cell type (or a system of the on cell type) that is configured from an integrated circuit in which the sensor controller 31 and the liquid crystal driving circuit 32 are integrated with each other and can adjust the refresh timing strictly is implemented. Although details are hereinafter described, the blank period BPa appears many times repetitively within one refresh cycle VT from its nature. In the present embodiment, each of the blank periods BPa appearing many times in this manner is enumerated as a blank period BP that appears within a cycle of the refresh rate Rr to implement communication between the control device 60 as the sensor controller 31 and the stylus 2.

Figures 11A, 11B, 11C:
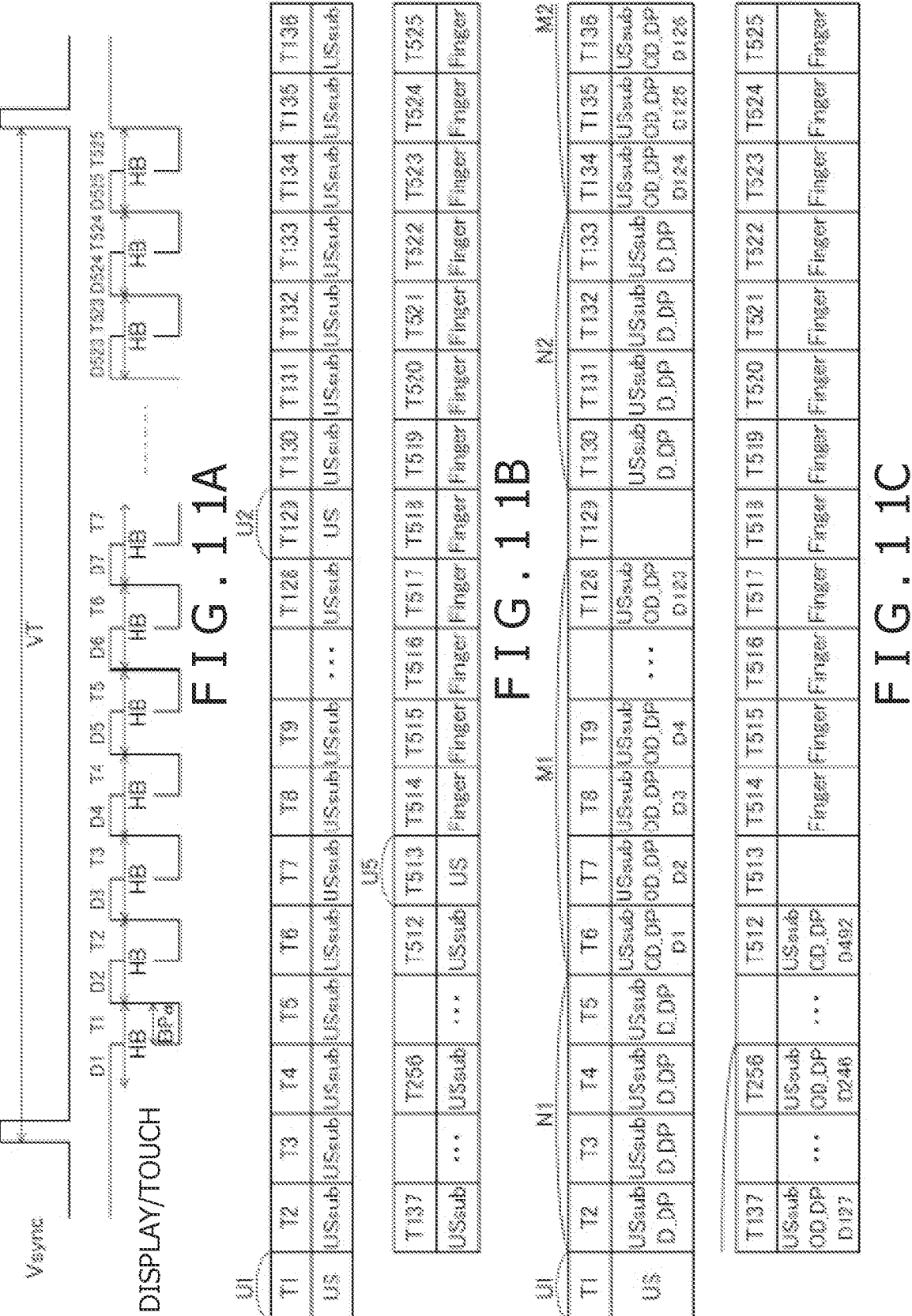
FIG. 11A is a view depicting an example of arrangement of a blank period BPa according to the second embodiment of the present disclosure.
FIGS. 11B and 11C are views depicting a manner of use of the blank period BPa of FIG. 11A by an indicator detection circuit 62 depicted in FIG. 10.

FIG. 11A is a view depicting an example of arrangement of a blank period BPa in the present embodiment. A refresh cycle VT corresponds to a time period (image frame time period) within which displaying of one image frame is performed as illustrated also in FIG. 7, and as depicted in FIG. 11A, the refresh cycle VT is configured so as to start together with activation of a video image synchronizing signal Vsync that is a pulse signal. In the example of FIG. 11A, the refresh cycle VT includes a first number of (525) horizontal blanking periods HB, the latter half of each of the horizontal blanking periods HB can be utilized as a blank period BPa. Accordingly, 525 blank periods BPa are arranged discretely in an equidistantly spaced relationship from each other in one refresh cycle VT. Since it is necessary to drive a pixel at a timing other than the blank period BPa, the potential of the row electrode group 45 is fixed to the fixed potential Vcom described hereinabove. Accordingly, the row electrode group 45 cannot be used for the object of detection of a finger touch, transmission of a signal toward the stylus 2, reception of a signal from the stylus 2 and so forth. On the other hand, within a blank period BPa, the potential of the row electrode group 45 is not fixed particularly. Therefore, the control device 60 is configured such that it executes actions as the sensor controller 31 described hereinabove in connection with the first embodiment such as detection of a finger touch, transmission of a signal toward the stylus 2, reception of a signal from the stylus 2 and so forth utilizing the blank period BPa. It is to be noted that, as regards the number or the arrangement method of blank periods BPa within one refresh cycle VT, various ones may available such that they increases as the resolution with which they are compatible becomes higher like quadruple/quarter full high definition (QHD) or full high definition (HD) or conversely the number of blank periods PBa is intensively reduced to several tens.

Referring back to FIG. 10, the control circuit 61 has stored therein in advance a plurality of prescribed refresh cycles VT and arrangement methods of a plurality of prescribed blank periods BPa and selects one refresh cycle VT and one arrangement method in order to generate a driving signal LD. As a concrete example, the control circuit 61 has stored therein in advance two refresh cycles VT of 60 Hz and 48 Hz, and where the liquid crystal panel 33 is connected to an AC power supply, the control circuit 61 selects 60 Hz, but where the liquid crystal panel 33 is driven by a battery, the control circuit 61 selects 48 Hz. The reason why the refresh cycle VT is lowered where the liquid crystal panel 33 is driven by a battery in this manner is that it is intended to reduce the power consumption. Further, as an arrangement method of the blank period BPa, the control circuit 61 stores an arrangement method in which a first number of (for example, 525) blank periods BPa are arranged in one refresh cycle VT and another arrangement method in which a second number (number different from the first number) of blank periods BPa are arranged within one refresh cycle VT, and selects one of the arrangement methods in response to a type of the liquid crystal panel 33 or the like. The control circuit 61 generates a driving signal LD in response to the selected refresh cycle VT and arrangement method of the blank period BPa and supplies the selected refresh cycle VT and arrangement method of the blank period BPa to the indicator detection circuit 62.

The indicator detection circuit 62 performs detection of a finger touch, transmission of a signal toward the stylus 2, reception of a signal from the stylus 2 and so forth utilizing a plural number of blank period BPa included in a refresh cycle VT. The indicator detection circuit 62 is configured such that it repetitively performs the mentioned processes in one set in a circuit of one refresh cycle VT.

FIGS. 11B and 11C are views depicting examples of a manner of use of the blank period BPa by the indicator detection circuit 62 in the case where a first number L1 (as an example, L1=525) of blank periods BPa are arranged within one refresh cycle VT. In FIGS. 11A and 11C, time periods T1 to T525 individually corresponding to the first number L1 of blank periods BPa and communication performed within individual blank periods BPa are depicted. FIG. 11B depicts an example before a stylus 2 is detected, and FIG. 11C illustrates allocation of transmission of N position signals D_DP and M data signals OD_DP after a stylus 2 is detected.

First, when a stylus 2 is not detected as yet, the indicator detection circuit 62 transmits an uplink signal US in which a search pattern D_UP is included at a plurality of time periods T1, T129, T257, . . . , T513 as depicted in FIG. 11B. This search pattern D_UP includes a sequence number indicative of what numbered search pattern the search pattern D_UP is such that a stylus 2 receiving this can acquire a reference time point for a refresh cycle VT.

Figure 12:
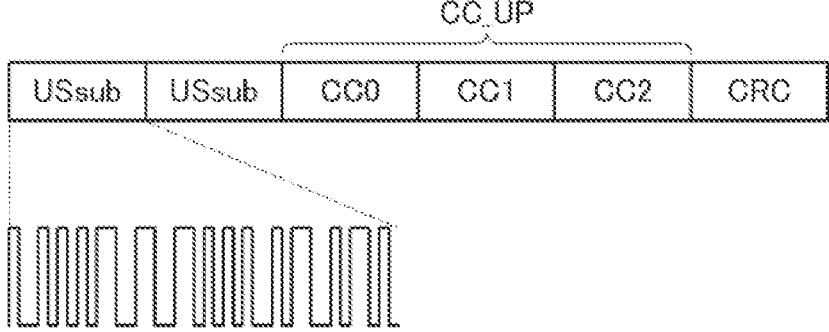
FIG. 12 is a view depicting an example of a configuration of an uplink signal US illustrated in FIGS. 11A, 11B, and 11C.

FIG. 12 is a view depicting an example of a configuration of the uplink signal US configured in this manner. The uplink signal US according to the example of FIG. 12 is configured including, in order from the top, two auxiliary uplink signals US sub, three command signals CC0 to CC2 and a cyclic redundancy code CRC generated from the command signals CC0 to CC2.

One auxiliary uplink signal US sub is a signal including a search pattern D_UP of one bit known in advance to a stylus 2. The uplink signal US including a search pattern D_UP or a command CC_UP of a plurality of bits is an uplink signal US that is to make a reference for synchronization corresponding to the refresh cycle VT of the liquid crystal panel 33 at present similarly as in the first embodiment, and the auxiliary uplink signal US sub plays a role of notifying a stylus 2 of individual time points of a plurality of existing individual blank periods BPa and transmission timings of the downlink signal DS within the individual blank periods BPa. This is because it is intended to notify a stylus 2 of individual patterns of blank periods BPa, which become different depending upon the situation of liquid crystal driving, without the necessity for sharing the individual patterns with the stylus 2 in advance. One auxiliary uplink signal US sub is a signal for a short time period in comparison with the uplink signal US, and it becomes possible to receive a downlink signal DS within one blank period BPa.

Although the blank period BPa in the second embodiment is a short time period in comparison with the blank period BP in the first embodiment, since the auxiliary uplink signal US sub is a signal of a time length corresponding to one bit, a time period within which the stylus 2 transmits a downlink signal DS in response to the auxiliary uplink signal US sub can be secured within one blank period BPa.

It is to be noted that the auxiliary uplink signal US sub is transmitted in a state in which a frequency of a signal generated by a spread code of a predetermined chip number is spread. The stylus 2 is configured such that, by executing a correlation process for a known spread code transmitted in this manner, arrival of the auxiliary uplink signal US sub is detected. The reason why the auxiliary uplink signal US sub is transmitted twice is that it is intended to make it possible for the stylus 2 to distinguish an uplink signal US for identifying a frame of the refresh cycle VT and an auxiliary uplink signal US sub for indicating an individual blank period BPa from each other.

The command signals CC0 to CC2 are signals each indicating a command CC_UP to be conveyed to the stylus 2. Though not depicted in FIG. 12, also the command signals CC0 to CC2 are transmitted in a state in which they are spread by a spread code of a predetermined chip number similarly to the auxiliary uplink signal US sub. It is to be noted that the information amount indicated by each of the command signals CC0 to CC2 differs depending upon a manner of use of the spread code. For example, where one bit is represented by inversion/non-inversion of the spread code, each of the command signals CC0 to CC2 represents information of one bit. On the other hand, where a spread code is used by cyclically shifting, each of the command signals CC0 to CC2 can represent a greater number of bits. In any case, the stylus 2 has stored in advance therein all spread codes that may possibly be received and is configured such that, by executing a correlation process between each of the spread codes and a reception signal, it receives the command signals CC0 to CC2. The command CC_UP conveyed through the command signals CC0 to CC2 includes information indicative of a refresh cycle VT (for example 48 Hz or 60 Hz), information indicative of an arrangement method of the blank period BPa (for example, whether the first number or the second number of blank periods BPa are arranged within one refresh cycle VT), information indicative of data to be sent from the stylus 2 to the control device 60 (that one of operation state data OD and configuration data CD described hereinabove in connection with the first embodiment, which is required by the control device 60), information indicative of a blank period BPa to be used for transmission of data by the stylus 2 and so forth.

The cyclic redundancy code CRC is a code indicative of a remainder when data indicated by the command signals CC0 to CC2 is regarded as a numerical value and this is divided by a predetermined constant.

Referring back to FIG. 11B, when a stylus 2 is not detected as yet, within the time periods T2 to T128 and so forth other than the time periods T1, T129, . . . , T513, the indicator detection circuit 62 performs transmission of an auxiliary uplink signal US sub. The substance of the auxiliary uplink signal US sub transmitted here is same as that of the auxiliary uplink signal US sub within the uplink signal US described hereinabove with reference to FIG. 12. Though not depicted, the indicator detection circuit 62 performs such transmission of a single auxiliary uplink signal US sub at least once at the top of all of the time periods including those after detection of a stylus 2. By transmitting an uplink signal US and an auxiliary uplink signal US sub in combination in this manner, while a command CC_UP is conveyed to the stylus 2 by the uplink signal US, by receiving a position signal D_DP at an early stage from the stylus 2 that receives the auxiliary uplink signal US sub, the control device 60 can detect the stylus 2 as early as possible.

The stylus 2 receiving the auxiliary uplink signal USsub transmits a position signal D_DP for notifying the control device 60 of presence of the stylus 2 itself at an early stage. The indicator detection circuit 62 that receives the position signal D_DP from the stylus 2 determines that the stylus 2 is detected already and changes the method of use of later time periods as depicted in FIG. 11C. In particular, only the time period T1 positioned at the top of one frame is used as the "first blank period" within which the uplink signal US described hereinabove is to be transmitted, and at least one of the remaining time periods is used as the "second blank period" within which the downlink signal DS is to be transmitted by the stylus 2. In the example of FIG. 11C, the time periods to be used as the "second blank period" within L1 blank periods are the time periods T2 to T128, T130 to T256 and so forth. More particularly, totaling N time periods including N1 time periods of the time periods T2 to T5 and N2 time periods T130 to T133 and so forth are utilized by the stylus 2 to transmit a position signal D_DP. Meanwhile, totaling M time periods including M1 time periods T6 to T128, M2 time periods T134 to T256 and so forth are utilized by the stylus 2 to transmit a data signal OD_DP including operation state data OD and so forth. In the following description, a data signal OD_DP transmitted within an mth (m is an integer from 1 to 492) time period among the M time periods is sometimes represented as data signal Dm as depicted in FIG. 11C. The other time periods are used by the indicator detection circuit 62 to detect a finger touch.

Figure 13:
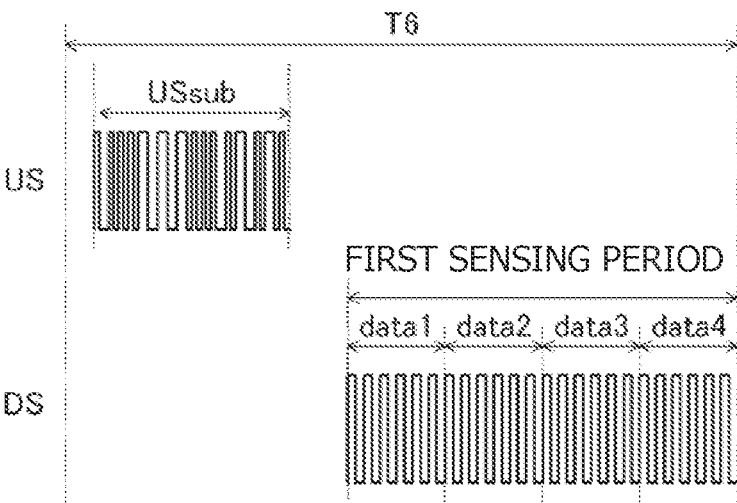
FIG. 13 is a view depicting an example of the uplink signal US and a downlink signal DS in the case where a stylus 2 performs transmission of a data signal OD_DP within a time period T6.

FIG. 13 illustrates an example of the auxiliary uplink signal US sub and the downlink signal DS in the case where the stylus 2 performs transmission of the data signal OD_DP within the time period T6 as an example. Though not depicted, this similarly applies also to the other case in which the stylus 2 performs transmission of the data signal OD_DP within any other time period.

As depicted in FIG. 13, at the top of the time period T6, an auxiliary uplink signal US sub including a search pattern D_UP of one bit is transmitted once by the indicator detection circuit 62. In response to reception of the auxiliary uplink signal US sub once, the stylus 2 starts transmission of a data signal OD_DP within the remaining time period of the blank period BPa. For example, data data1 to data4 of four bits are transmitted at once.

Referring back to FIGS. 11A, 11B, and 11C, in the example of FIG. 11C, 492 time periods for transmitting a data signal OD_DP are secured. The stylus 2 is configured such that it transmits data of the first type (for example, the configuration data CD) within the M1 time periods from among the 492 time periods and transmits operation state data OD within the M2 (M2≥0) time periods. This is described below in connection with a particular example.

FIG. 14A depicts an example where M1=0 and M2=492. In the present example, data S1 and S2 of two bits indicative of on/off states of the operation inputting circuit 26 depicted in FIG. 2 and data indicative of a writing pressure F are transmitted using six data signals D1 to D3.

In particular, the data S1 indicative of an on/off state of the operation inputting circuit 26 is transmitted using the data data3 and data4 of the data signal D1. Consequently, an on/off state of the operation inputting circuit 26 is conveyed to the control device 60 twice within one refresh cycle VT. However, this is a configuration for providing redundancy. The writing pressure F is transmitted using the data data1 to data4 of the data signal D2 and the data data1 to data4 of the data signal D3.

Here, as exemplified in FIG. 14A, the data S1 and the writing pressure F may be transmitted from the stylus 2 to the control device 60 by the number of times equal to or more than twice within one refresh cycle VT. Consequently, since the control device 60 can receive the data S1 and the writing pressure F with a higher frequency, it is possible to reproduce the width of a handwriting of the stylus 2 with a higher degree of accuracy. In this case, preferably the transmission timing of the data S1 and the writing pressure F is set such that the data S1 and the writing pressure F are transmitted individually after equal time intervals.

FIG. 14B depicts an example in which M1=5 and M2=2. In the present example, the stylus identifier SID and the writing pressure F are transmitted using all of the data signals D1 to D7.

More particularly, first the stylus identifier SID is transmitted using the data signals D1 to D5. However, since the data amount is excessively great and the data cannot be transmitted only within one refresh cycle VT, it is transmitted over a plurality of successive refresh cycles VT. On the other hand, the writing pressure F is transmitted using the data signals D6 and D7. Consequently, in the present example, data for eight bits indicative of the writing pressure F is transmitted once within every refresh cycle VT.

Here, the stylus identifier SID is information which may be sent only once when the indicator detection circuit 62 detects a stylus 2. Accordingly, initially when a stylus 2 is detected by the indicator detection circuit 62, after the stylus 2 transmits its stylus identifier SID once using the time periods as depicted in FIG. 14B, the stylus 2 preferably uses also the data signals D1 to D5 for transmission of the writing pressure F. By this, after the stylus identifier SID is conveyed once to the control device 60, it becomes possible to send the writing pressure F with a high frequency, and also it becomes possible to notify the control device 60 of an on/off state of the operation inputting circuit 26 or a state of the battery.

Now, processes performed by the indicator detection circuit 62 and the stylus 2 according to the present embodiment are described more particularly again with reference to respective processing flow diagrams.

Figure 15:
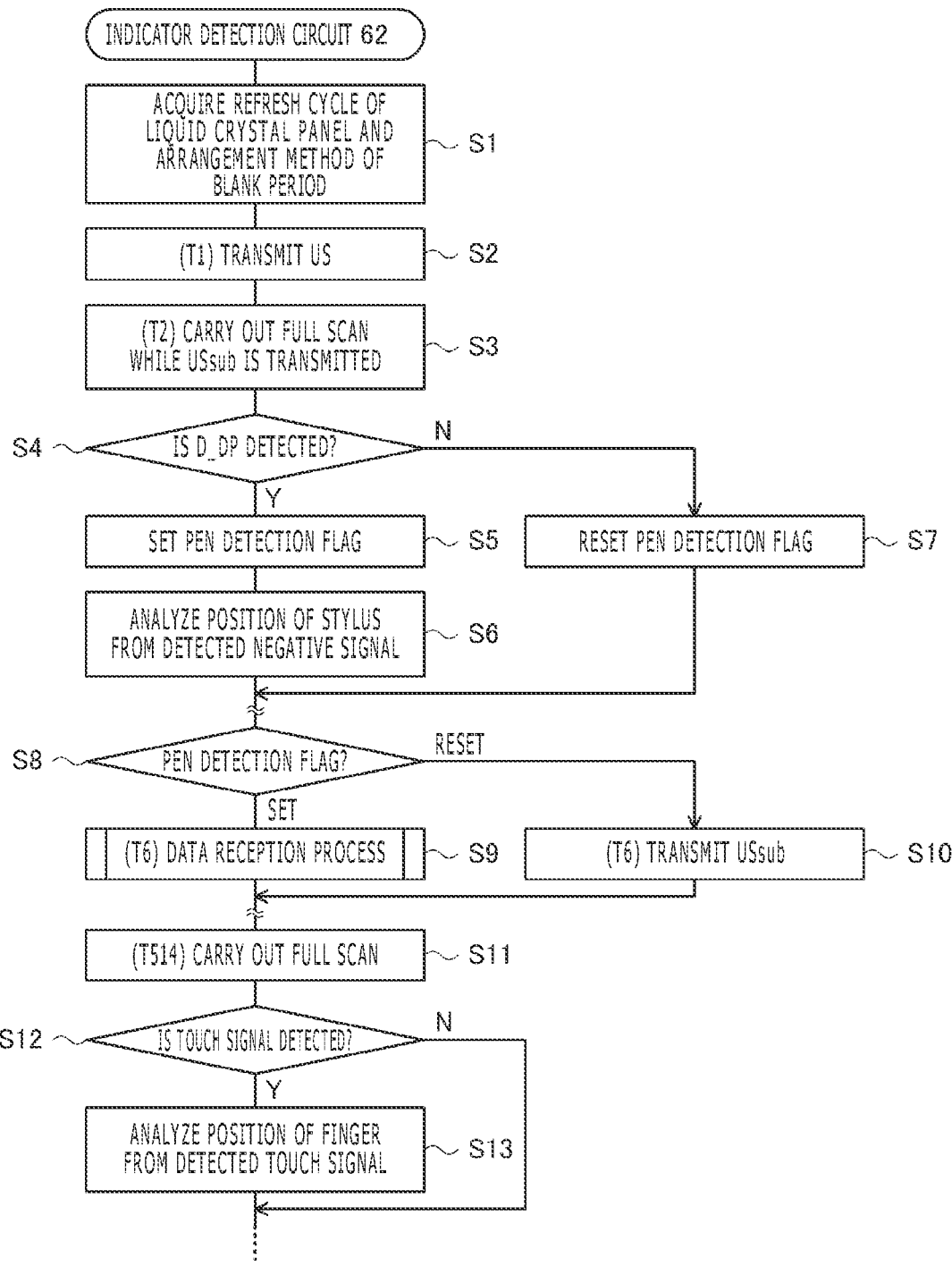
FIG. 15 is a processing flow diagram depicting a process performed by the indicator detection circuit 62 depicted in FIG. 10.

FIG. 15 is a processing flow diagram illustrating processes performed by the indicator detection circuit 62. Although this processing flow assumes the arrangement method of the blank period BPa depicted FIGS. 11B and 11C, also where a different arrangement method is used, the processing flow similarly applies although processes performed within individual time periods are replaced.

The indicator detection circuit 62 first acquires a refresh cycle VT of the liquid crystal panel 33 and an arrangement method of the blank period BPa within the refresh cycle VT (S1). Then, the indicator detection circuit 62 uses the time period T1 to transmit an uplink signal US including a command CC_UP that indicates the acquired refresh cycle VT and arrangement method of the blank period BPa (S2). Thereafter, within the next time period T2, the indicator detection circuit 62 transmits an auxiliary uplink signal USsub and executes detection of a position signal D_DP transmitted from an unknown stylus 2 using all of the electrodes that configure the row electrode group 45 and the column electrode group 46 (full scan) (S3).

The indicator detection circuit 62 decides whether or not a position signal D_DP is detected (S4), and if it decides that a position signal D_DP is detected, then it sets a pen detection flag (S5) and analyzes the position of the stylus 2 from the detected signal (S6). On the other hand, if it is decided at S3 that a position signal D_DP is not detected, then the indicator detection circuit 62 resets the pen detection flag (S7). It is to be noted that the pen detection flag is an internal flag of the indicator detection circuit 62, and while a stylus 2 remains detected, the pen detection flag indicates the set state, but while a stylus 2 is not detected, the pen detection flag indicates the reset state.

The process at S2 from among the described above is performed, when a stylus 2 is not detected as yet, similarly as in the time period T1, also within the other time periods T129, T257, T385 and T513 allocated to transmission of the uplink signal US. On the other hand, if a stylus 2 is detected already, then the process at S2 is not performed within the other time periods T129, T257, T385 and T513. Further, the processes at S3 to S6 are performed similarly as in the time period T2 also within the other time periods T3 to T5, T130 to T133, T258 to T262 and T386 to T389 allocated to reception of the position signal D_DP.

Within the time period T6, the indicator detection circuit 62 first confirms the pen detection flag (S8), and if the pen detection flag is in the set state (namely, if a stylus 2 is detected), then the indicator detection circuit 62 performs a data reception process (S9). On the other hand, if the pen detection flag is in the reset state, then the indicator detection circuit 62 performs only transmission of an auxiliary uplink signal US sub (S10).

Figure 16:
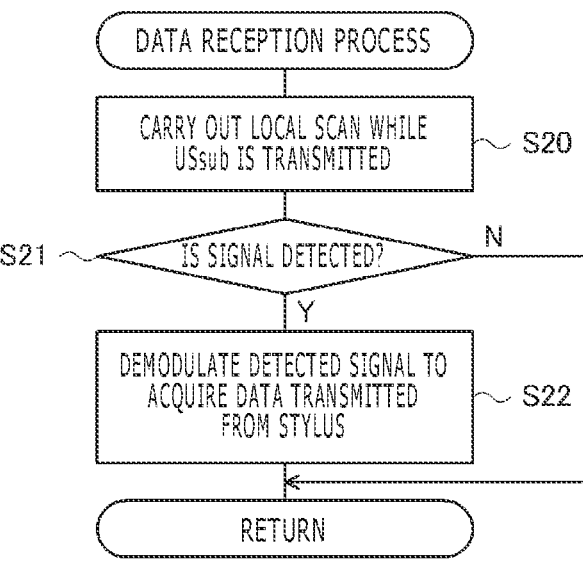
FIG. 16 is a processing flow diagram illustrating details of a data reception process performed at S8 depicted in FIG. 15.

FIG. 16 is a processing flow diagram illustrating details of the data reception process performed at S9. As depicted in FIG. 16, the indicator detection circuit 62 first transmits an auxiliary uplink signal US sub and executes detection of a data signal OD_DP (S20) utilizing only electrodes in the proximity of the position detected at S6 from within the row electrode group 45 and the column electrode group 46 (local scan). Then, the indicator detection circuit 62 decides whether or not some signal is detected as a result of the execution of the detection (S21). Then, if it is decided that some signal is detected, then the indicator detection circuit 62 demodulates the detected signal to acquire the data transmitted from the stylus 2 (S22), whereafter the indicator detection circuit 62 ends the data reception process. On the other hand, if it is decided that no signal is detected, then the indicator detection circuit 62 particularly performs nothing and ends the data reception process.

Referring back to FIG. 15, the processes at S8 to S10 are performed similarly as in the time period T6 also within time periods actually used for reception of a data signal OD_DP from among the other time periods T6 to T128, T134 to T256, T262 to T384 and T390 to T512 allocated to reception of the data signal OD_DP.

Within the time period T514, the indicator detection circuit 62 performs detection of a finger touch using all of the electrodes configuring the row electrode group 45 and the column electrode group 46 (full scan) (S11).

The indicator detection circuit 62 decides whether or not a signal of a finger touch is detected by the full scan at S11 (S12), and if it is decided that a signal of a finger touch is detected, then the indicator detection circuit 62 analyzes the position of the finger from the detected signal (S13). On the other hand, if it is decided at S12 that a signal of a finger touch is not detected, then the indicator detection circuit 62 advances its processing to a next time period without performing any process especially.

The processes at S11 to S13 are performed similarly as in the time period T514 also within the other time periods T513 to T525 allocated to detection of a finger.

In this manner, the indicator detection circuit 62 repetitively performs processes allocated to the time periods T1 to T525 depicted in FIGS. 11A, 11, and 11C in the order of the time periods T1 to T525. Further, if a new refresh cycle VT is entered, then the processes beginning with the process at S1 are repeated. Consequently, acquisition of a refresh cycle VT and an arrangement method of the blank period BPa, transmission of an uplink signal US, detection and position derivation of a stylus 2, reception of a data signal OD_DP transmitted from the stylus 2, and detection and position derivation of a finger touch are repeated time-divisionally.

Figure 17:
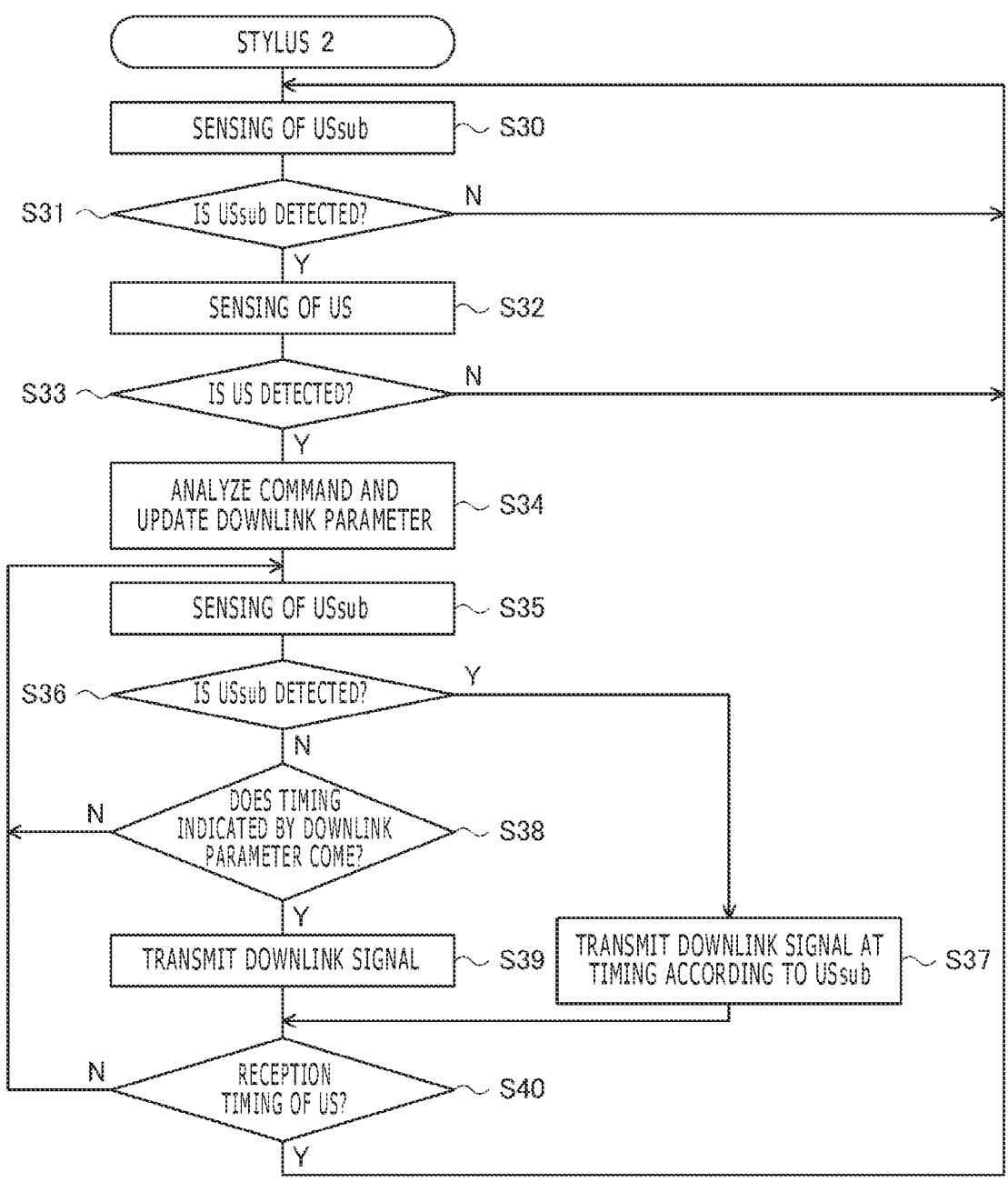
FIG. 17 is a processing flow diagram illustrating a process performed by the stylus 2 depicted in FIG. 10.

FIG. 17 is a processing flow diagram illustrating processes performed by a stylus 2. As depicted in FIG. 17, the stylus 2 first performs sensing of an auxiliary uplink signal US sub (S30) and decides whether or not an auxiliary uplink signal US sub is detected by the sensing (S31). The stylus 2 repetitively executes the processes at S30 and S31 while the power supply remains on.

If it is decided at S31 that an auxiliary uplink signal US sub is detected, then the stylus 2 subsequently performs sensing of an uplink signal US including a search pattern D_UP (S32) and decides whether or not an uplink signal US is detected by the sensing (S33). This process is in short a process of deciding whether an auxiliary uplink signal US sub detected at S30 is transmitted alone or is part of an uplink signal US (refer to FIG. 12). If it is decided at S33 that an uplink signal US is not detected, then the processing returns to S30, at which the stylus 2 performs sensing of a next auxiliary uplink signal US sub.

If it is decided at S33 that an uplink signal US is detected, then the stylus 2 subsequently analyzes a command CC_UP included in the detected uplink signal US and updates downlink parameters on the basis of a result of the analysis (S34). The downlink parameters are in short various kinds of information included in the command described hereinabove, namely, information indicative of a refresh cycle VT (for example, 48 Hz or 60 Hz), information indicative of an arrangement method of the blank period BPa (for example, whether the first number or the second number of blank periods BPa are to be arranged within one refresh cycle VT), information indicative of data to be sent from the stylus 2 to the control device 60 (that one of the operation state data OD and the configuration data CD described hereinabove in connection with the first embodiment which is required by the control device 60), information indicative of a blank period BPa to be used for transmission of data by the stylus 2 and so forth, and the stylus 2 retains the received downlink parameters until new downlink parameters are received subsequently.

Then, the stylus 2 executes sensing of an auxiliary uplink signal US sub again (S35) and decides whether or not an auxiliary uplink signal USsub is detected by the sensing (S36). As a result, if it is decided that an auxiliary uplink signal US sub is detected, then the stylus 2 performs transmission of a downlink signal DS, which is a position signal D_DP or a data signal OD_DP that includes data indicated by the downlink parameters at a timing according to the auxiliary uplink signal USsub (S37).

If it is decided at S36 that an auxiliary uplink signal US sub is not detected, then the stylus 2 decides whether or not a transmission timing indicated by the downlink parameters comes (S38), and if it is decided that a transmission timing comes, then the stylus 2 performs transmission of a downlink signal DS (S39). This process is a process for preventing transmission of a downlink signal DS from being skipped by a reception miss of the auxiliary uplink signal US sub. In particular, the stylus 2 can predict a timing at which a downlink signal DS is to be transmitted next on the basis of the refresh cycle VT and the arrangement method of the blank period BPa included in the downlink parameters. Therefore, even when an auxiliary uplink signal US sub is not received, if the predicted timing comes, then the stylus 2 transmits a downlink signal DS.

If it is decided at S38 that the transmission timing indicated by the downlink parameters does not come as yet, then the stylus 2 returns its processing to S35, at which it performs sensing of an auxiliary uplink signal US sub again.

After a downlink signal DS is transmitted at S37 or S39, the stylus 2 decides on the basis of the downlink parameters retained therein whether or not a reception timing of an uplink signal US comes (S40). As a result, if it is decided that a reception timing does not come, then the stylus 2 returns the processing to S35 in order to transmit a next downlink signal DS. On the other hand, if it is decided at S40 that a reception timing comes, then the stylus 2 returns the processing to S30. Consequently, similar processes are repeated for every refresh cycle VT.

As described above, with the position inputting system 1, sensor controller 31, and stylus 2 as well as the method performed by them according to the present embodiment, since the control device 60 as a sensor controller acquires a refresh cycle VT at present of the liquid crystal panel 33, it is possible for the control device 60 to transmit an uplink signal US, which makes a reference for synchronization corresponding to the acquired refresh cycle VT, to the stylus 2. Accordingly, it is possible to convey a preferable transmission timing of a signal according to a state of the liquid crystal panel 33 to the stylus 2.

Further, since the uplink signal US includes information indicative of an arrangement method of the blank period BPa, the stylus 2 can transmit a downlink signal DS within a blank period BPa in which noise is low.

Although preferred embodiments of the present disclosure are described, the present disclosure is not limited to the embodiments at all, and it is a matter of course that the present disclosure can be carried out in various modes without departing from the subject matter thereof.

For example, while the second embodiment described above is directed to an example in which the indicator detection circuit 62 transmits an auxiliary uplink signal US sub at the top of each time period, such transmission of an auxiliary uplink signal US sub is not always necessary. In particular, since a refresh cycle and an arrangement method of the blank period BPa are conveyed in advance to the stylus 2 by an uplink signal US as described hereinabove with reference to FIG. 17, the stylus 2 can know a start timing of each time period even if an auxiliary uplink signal USsub is not available. Accordingly, even if the stylus 2 does not receive an auxiliary uplink signal US sub, it can perform transmission of a downlink signal DS at an appropriate timing. Since there is the possibility in the first place also that an auxiliary uplink signal USsub may fail to be received, preferably it is positioned as an element for auxiliarily conveying a start of a time period.

Since transmission of the auxiliary uplink signal US sub is arbitrary in this manner, the command CC_UP included in the uplink signal US may include information indicative of whether or not the indicator detection circuit 62 is to perform transmission of an auxiliary uplink signal US sub. By referring to this information, the stylus 2 can determine whether or not, when a downlink signal DS is to be transmitted, it is to wait an auxiliary uplink signal US sub.

It is to be noted that, while the foregoing embodiments are described taking the liquid crystal panel 33 as an example, the present disclosure can be applied also to display panels for which a display panel of a different type such as an organic EL panel is applied. More particularly, the present disclosure can be applied to a bidirectional communication system that uses an active stylus utilized together with a display panel in which each cycle of a refresh rate includes a display refresh period and one or more blank periods.

DESCRIPTION OF REFERENCE SYMBOLS

1 Position inputting system
2 Stylus
3 Electronic apparatus
20 Electrode
21 Transmission/reception switching circuit
22 Oscillation circuit
23 Transmission circuit
24 Reception circuit
25 Operation information detection circuit
26 Operation inputting circuit
27 Configuration information storage circuit
28 Communication control circuit
30 Electronic apparatus control circuit
31 Sensor controller
32 Liquid crystal driving circuit
33 Liquid crystal panel
34 Sensor board
35 Operation panel
40 Oscillation circuit
41 Transmission circuit
42 Reception circuit
43 Indicator detection circuit
44 Refresh cycle acquisition circuit
45 Row electrode group
45a to 45c Row electrode
46 Column electrode group
46a to 46c Column electrode
47 Transmission/reception switching circuit
50 Liquid crystal layer
51 Color filter glass plate
52 Polarizer
60 Control device
61 Control circuit
62 Indicator detection circuit
700 Transmission timing of uplink signal US
701, 702 Transmission timing of configuration data CD and operation state data OD
719 Response timing to uplink signal US
BP, BPa Blank period
CC_UP Command
CD Configuration data
CRTb1 Communication resource table
D_DP Position signal (response signal)
D_UP Search pattern
DA Display area DS Downlink signal
F_sel Frequency setting signal
HB Horizontal blanking period
HI Horizontal synchronization cycle
HSYNC Horizontal synchronizing signal
LCDnz Liquid crystal noise
LD Driving signal
ND Noise period
NDA Vertical direction non-displaying area
NF Noise-free period
NP Noise period
OD Operation state data
OD_DP, D1 to D492 Data signal
Pos Position information
Rr Refresh rate
S_sel Switching signal
US Uplink signal
USsub Auxiliary uplink signal
V Video signal
VB Vertical blanking period
Vcom Fixed potential
Vsync Video image synchronization signal
VT, VT1, VT2 Operation period
The invention claimed is:

1. A sensor controller for use with a stylus, the sensor controller comprising:

transmission circuitry, which, in operation, repeatedly transmits, to the stylus, auxiliary uplink signals (USsubs) each having a time length corresponding to one bit and indicating a downlink transmission timing for the stylus; and changes a transmission rate of uplink signals (US) based on a refresh cycle of a display coupled to the sensor controller, and transmits the uplink signals to the stylus at the changed transmission rate; and reception circuitry, which, in operation, receives downlink signals (DS) from the stylus;

wherein each of the uplink signals (US) includes:

two of the auxiliary uplink signals (USsubs);

a command identifying content of data to be transmitted from the stylus to the sensor controller in the downlink signals (DS), the content selected from a position of the stylus, operation state data (OD) of the stylus including dynamic data, or configuration data (CD) of the stylus including static data; and a cyclic redundancy code (CRC); and wherein the transmission circuitry, in response to the refresh cycle being a first refresh cycle, transmits the uplink signals to the stylus at a first transmission rate, and in response to the refresh cycle being a second refresh cycle different from the first refresh cycle, transmits the uplink signals to the stylus at a second transmission rate different from the first transmission rate.

2. The sensor controller of claim 1, wherein the transmission rate is a reciprocal of the refresh cycle.

3. The sensor controller of claim 1, wherein the transmission circuitry transmits the uplink signals in vertical blanking periods.

4. The sensor controller of claim 1, wherein the sensor controller is an in cell type display sensor controller.

5. The sensor controller of claim 1, wherein the sensor controller is an on cell type display sensor controller.

6. The sensor controller of claim 1, wherein the reception circuitry receives the downlink signals, which are transmitted from the stylus in response to the uplink signals, at a reception rate which is a reciprocal of the refresh cycle.

7. The sensor controller of claim 6, wherein the reception circuitry receives the downlink signals in horizontal blanking periods.

8. The sensor controller of claim 7, wherein the uplink signals include information which defines the horizontal blanking periods.

9. The sensor controller of claim 8, wherein the transmission circuitry, in response to the refresh cycle being changed from the first refresh cycle to the second refresh cycle, transmits the uplink signals including information which defines second horizontal blanking periods different from first horizontal blanking periods defined prior to the refresh cycle being changed from the first refresh cycle to the second refresh cycle.

10. A method performed by a sensor controller, the method comprising:

repeatedly transmitting, to a stylus, auxiliary uplink signals (USsubs) each having a time length corresponding to one bit and indicating a downlink transmission timing for the stylus;

changing a transmission rate of uplink signals (US) based on a refresh cycle of a display coupled to the sensor controller;

transmitting the uplink signals at the changed transmission rate to a stylus; and receiving the downlink signals (DS) from the stylus;

wherein each of the uplink signals (US) includes:

two of the auxiliary uplink signals (USsubs);

a command identifying content of data to be transmitted from the stylus to the sensor controller in the downlink signals (DS), the content selected from a position of the stylus, operation state data (OD) of the stylus including dynamic data, or configuration data (CD) of the stylus including static data; and a cyclic redundancy code (CRC); and wherein the transmitting the uplink signals includes:

transmitting the uplink signals to the stylus at a first transmission rate when the refresh cycle is a first refresh cycle, and transmitting the uplink signals to the stylus at a second transmission rate different from the first transmission rate when the refresh cycle is a second refresh cycle different from the first refresh cycle.

11. The method of claim 10, wherein the transmission rate is a reciprocal of the refresh cycle.

12. The method of claim 10, comprising:

transmitting the uplink signals in vertical blanking periods.

13. The method of claim 10, comprising:

receiving the downlink signals, which are transmitted from the stylus in response to the uplink signals, at a reception rate which is a reciprocal of the refresh cycle.

14. The method of claim 13, comprising:

receiving the downlink signals in horizontal blanking periods.

15. The method of claim 14, wherein the uplink signals include information which defines the horizontal blanking periods.

16. A system comprising:

a stylus; and a sensor controller including:

transmission circuitry, which, in operation, repeatedly transmits, to the stylus, auxiliary uplink signals (USsubs) to indicate a plurality of downlink transmission timings for the stylus; and changes a transmission rate of uplink signals (US) based on a refresh cycle of a display coupled to the sensor controller, and transmits the uplink signals to the stylus at the changed transmission rate; and reception circuitry, which, in operation, receives downlink signals (DS) from the stylus;

wherein each of the uplink signals (US) includes:

two of the auxiliary uplink signals (USsubs);

a command identifying content of data to be transmitted from the stylus to the sensor controller in the downlink signals (DS), the content selected from a position of the stylus, operation state data (OD) of the stylus including dynamic data, or configuration data (CD) of the stylus including static data; and a cyclic redundancy code (CRC); and wherein the transmission circuitry, in response to the refresh cycle being a first refresh cycle, transmits the uplink signals to the stylus at a first transmission rate, and in response to the refresh cycle being a second refresh cycle different from the first refresh cycle, transmits the uplink signals to the stylus at a second transmission rate different from the first transmission rate.

17. The system of claim 16, wherein the transmission rate is a reciprocal of the refresh cycle.

18. The system of claim 16, wherein the transmission circuitry transmits the uplink signals in vertical blanking periods.

19. The system of claim 16, wherein the sensor controller is an in cell type display sensor controller or an on cell type display sensor controller.

20. The sensor controller of claim 1, wherein the auxiliary uplink signal (USsub) indicates a time point of a blank period (BP) as the downlink transmission timing for the stylus.

* * * * *